United States Patent
Myokan

(10) Patent No.: US 11,881,001 B2
(45) Date of Patent: Jan. 23, 2024

(54) CALIBRATION APPARATUS, CHART FOR CALIBRATION, AND CALIBRATION METHOD

(71) Applicant: Sony Interactive Entertainment Inc., Tokyo (JP)

(72) Inventor: Yoshihiro Myokan, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 161 days.

(21) Appl. No.: 17/439,021

(22) PCT Filed: May 23, 2019

(86) PCT No.: PCT/JP2019/020560
§ 371 (c)(1),
(2) Date: Sep. 14, 2021

(87) PCT Pub. No.: WO2020/235110
PCT Pub. Date: Nov. 26, 2020

(65) Prior Publication Data
US 2022/0148225 A1 May 12, 2022

(51) Int. Cl.
*G06T 7/80* (2017.01)
*H04N 13/243* (2018.01)
*H04N 23/695* (2023.01)

(52) U.S. Cl.
CPC ............ *G06T 7/85* (2017.01); *H04N 13/243* (2018.05); *H04N 23/695* (2023.01); *G06T 2207/30244* (2013.01)

(58) Field of Classification Search
CPC ....... G06T 7/85; H04N 13/243; H04N 23/695
See application file for complete search history.

(56) References Cited

U.S. PATENT DOCUMENTS

| 7,978,931 | B2 | 7/2011 | Pan |
| 9,596,459 | B2 | 3/2017 | Keaffaber |
| 11,039,121 | B2 | 6/2021 | Myokan |
| 2004/0170315 | A1* | 9/2004 | Kosaka .................... G06T 7/80 382/154 |

(Continued)

FOREIGN PATENT DOCUMENTS

| CN | 105488775 A | 4/2016 |
| CN | 106780632 A | 5/2017 |

(Continued)

OTHER PUBLICATIONS

Notification of Reasons for Refusal for corresponding JP Application No. 2021-520032, 8 pages, dated Oct. 27, 2022.

(Continued)

*Primary Examiner* — Rowina J Cattungal
(74) *Attorney, Agent, or Firm* — Matthew B. Dernier, Esq.

(57) ABSTRACT

A jig holds an imaging apparatus including a plurality of cameras with different optical axis orientations and a chart including a plurality of planes with different angles and changes the orientation of the imaging apparatus relative to the chart. A calibration apparatus obtains camera parameters of the imaging apparatus by sequentially acquiring captured images captured by adjacent cameras when these cameras have obtained predetermined fields-of-view relative to the chart and extracting images of feature points of chart patterns.

11 Claims, 14 Drawing Sheets

(56) References Cited

U.S. PATENT DOCUMENTS

| | | |
|---|---|---|
| 2007/0211934 A1 | 9/2007 | Pan |
| 2016/0073101 A1 | 3/2016 | Keaffaber |
| 2017/0243374 A1* | 8/2017 | Matsuzawa ............... G06T 7/80 |
| 2020/0177866 A1 | 6/2020 | Myokan |

FOREIGN PATENT DOCUMENTS

| | | | |
|---|---|---|---|
| CN | 106878687 A | | 6/2017 |
| EP | 0999518 A1 | | 5/2000 |
| JP | 2007259436 A | | 10/2007 |
| JP | 2012189551 A | * | 10/2012 |
| JP | 2012189551 A | | 10/2012 |
| JP | 2017536711 A | | 12/2017 |
| WO | 2018235163 A1 | | 12/2018 |
| WO | 2019050417 A1 | | 3/2019 |

OTHER PUBLICATIONS

The First Office Action for corresponding CN Application No. 201980096450.6, 32 pages, dated Jan. 12, 2023.
International Search Report for corresponding PCT Application No. PCT/JP2019/020560, 4 pages, dated Jul. 30, 2019.
Zhengyou Zhang, "A Flexible New Technique for Camera Calibration," Microsoft Research, Technical Report MSR-TR-98-71, 22 pages, Dec. 2, 1998.

\* cited by examiner (a)      (b)

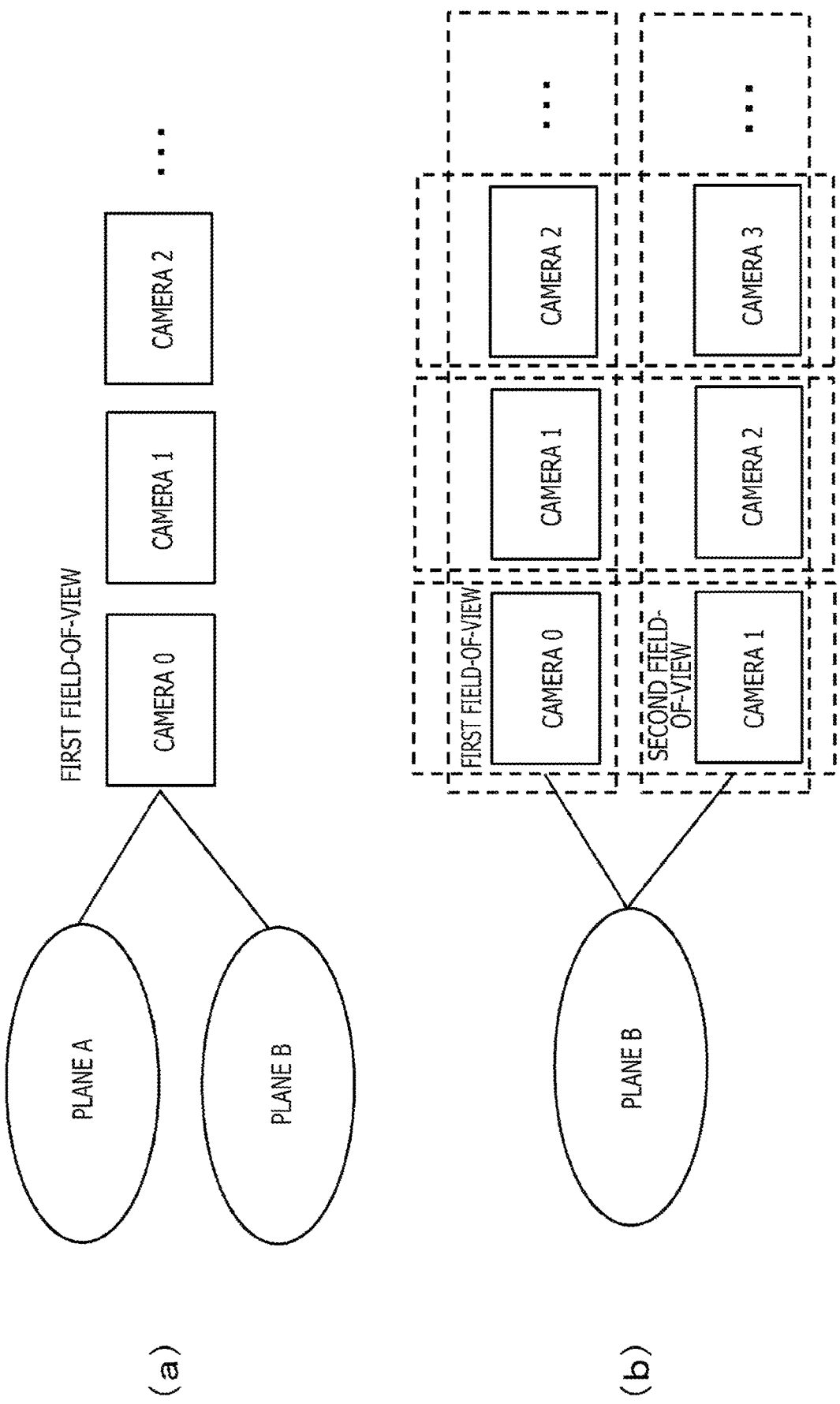

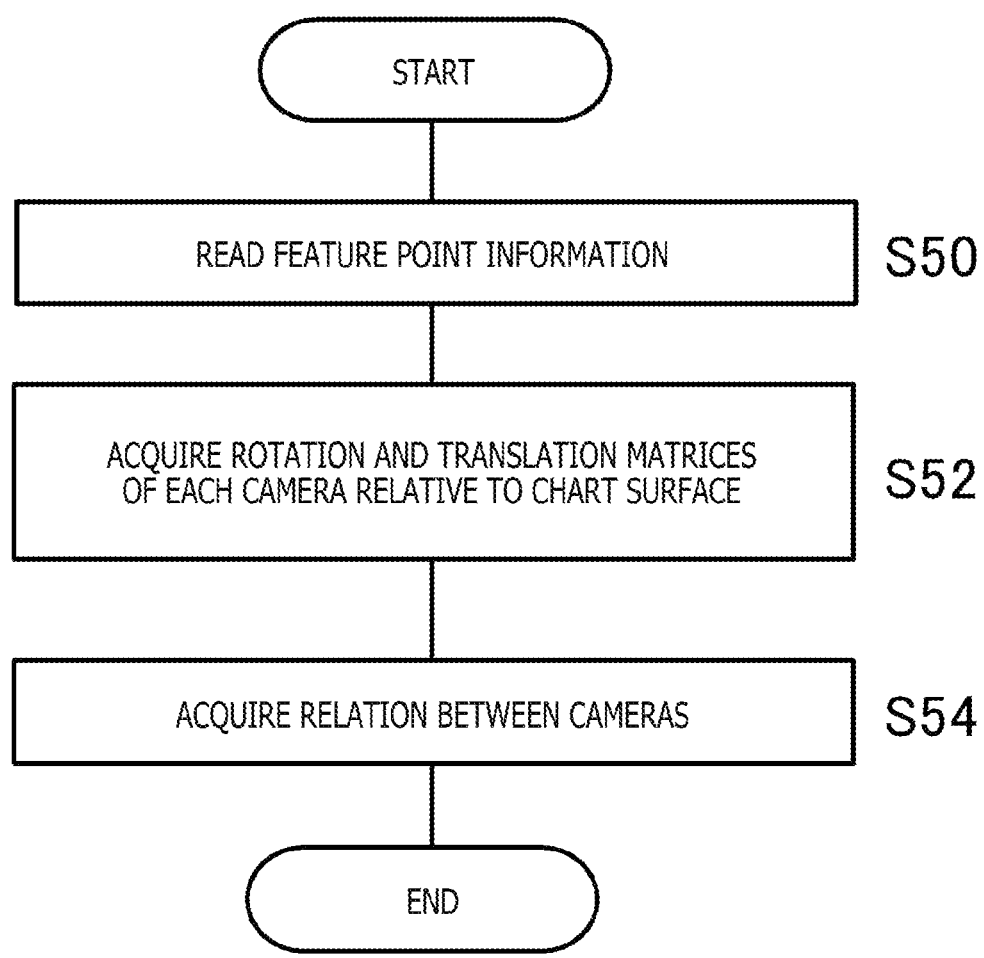

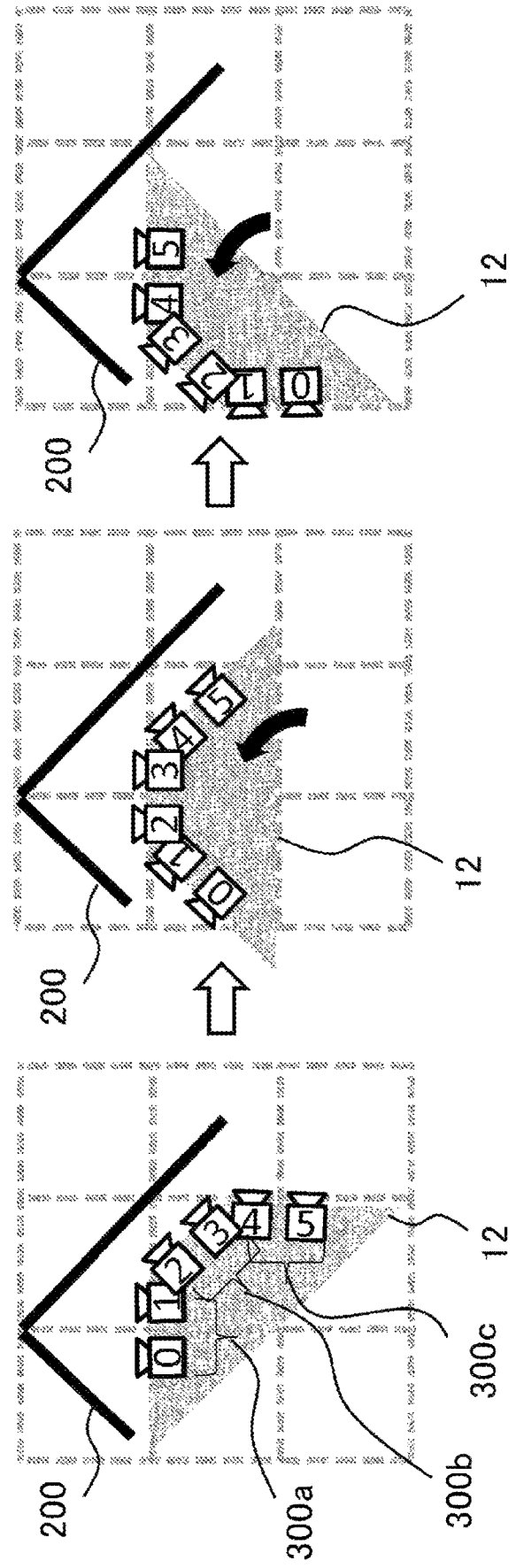

CALIBRATION APPARATUS, CHART FOR CALIBRATION, AND CALIBRATION METHOD

TECHNICAL FIELD

The present invention relates to an apparatus for calibrating an imaging apparatus, a chart used for calibration, and a calibration method.

BACKGROUND ART

A technique of using a captured image for display or analyzing the captured image to acquire predetermined information is widely introduced into content of electronic games and the like, security cameras, in-vehicle cameras, robot control, and the like. In order to ensure processing accuracy in such systems, a calibration process is performed to acquire, in advance, apparatus-specific information such as intrinsic and extrinsic parameters of an imaging apparatus. The intrinsic parameters define the relation between position coordinates of pixels in a captured image and position coordinates in a camera coordinate system, which has an origin at an optical center and uses the length as the unit, and represent the characteristics of a camera optical system determined by a distortion correction coefficient, a focal length, a relative position of the origin, a shear factor, and a scale factor.

Here, the distortion correction coefficient is a coefficient for correcting lens-induced radial distortion or lens-induced circumferential distortion. The extrinsic parameters define the relation between a camera coordinate system and a world coordinate system and are used for the purpose of, for example, performing simultaneous calibration of a multi-eye camera such as, in particular, a stereo camera to adjust inclinations of individually-captured images. A Zhang's method is widely known as a calibration technique (refer to NPL 1). The Zhang's method is a method of capturing an image of a plane chart having a checkered pattern from a plurality of viewpoints and optimizing parameters so as to correct association between positions of feature points in the captured image and positions of feature points on the plane of the chart in a real space.

[Citation List] [Patent Literature]

[PTL 1] European Patent Application Publication No. 0999518

Non Patent Literature

[NPL 1] Zhengyou Zhang, "A Flexible New Technique for Camera Calibration," Microsoft Research Technical Report, MSR-TR-98-71, Dec. 2, 1998.

SUMMARY

Technical Problems

With the method introduced in NPL 1, it is necessary to set an imaging apparatus and a chart at several positions and postures and repeatedly capture an image. This imposes a heavy workload. The workload of image capturing can be reduced under certain restraint conditions. However, it is conceivable that versatility may be lost by such restraint conditions. Further, a simple calibration method is not likely to achieve accuracy comparable to that of the Zhang's method. In recent years, an imaging apparatus including a plurality of cameras with different optical axis orientations has been widely used to obtain a wide-angle image such as a whole-sky image. However, an increase in the number of cameras increases the time and effort required for calibration.

The present invention has been made in view of the problem described above. It is an object of the present invention to provide a technique by which an imaging apparatus can be calibrated with high accuracy with reduced man-hours.

Solution to Problems

In order to solve the problem described above, one aspect of the present invention relates to a calibration apparatus. This calibration apparatus calibrates an imaging apparatus including a plurality of cameras with different optical axis orientations and includes an image acquisition section configured to acquire data of images of a chart captured from different directions by at least two cameras among the plurality of cameras, the chart including a plurality of planes with different angles, a feature point information acquisition section configured to detect, from each of the images, images of feature points of a pattern depicted on the chart and generate feature point information in which position coordinates of the images of the feature points are associated with position coordinates of the feature points on the chart, and a calibration section configured to acquire a parameter including position and posture information between the cameras on the basis of the feature point information.

Another aspect of the present invention relates to a chart for calibration. This chart for calibration is used to calibrate an imaging apparatus including a plurality of cameras with different optical axis orientations and includes a plurality of planes forming a predetermined angle, in which any one plane among the plurality of planes includes an area whose depicted pattern has been subjected to projective transformation according to angles of imaging planes of adjacent cameras that each simultaneously capture an image of the plane among the plurality of cameras, and an area whose depicted pattern is not subjected to the projective transformation.

Yet another aspect of the present invention relates to a calibration method. This calibration method includes, by a calibration apparatus for calibrating an imaging apparatus including a plurality of cameras with different optical axis orientations, a step of acquiring data of images of a chart captured from different directions by at least two cameras among the plurality of cameras, the chart including a plurality of planes with different angles, a step of detecting, from each of the images, images of feature points of a pattern depicted on the chart and generating feature point information in which position coordinates of the images of the feature points are associated with position coordinates of the feature points on the chart, and a step of acquiring a parameter including position and posture information between the cameras on the basis of the feature point information.

It is noted that any combinations of the constituent components described above and the expressions of the present invention that are converted between a method, an apparatus, a system, a recording medium, a computer program, and the like are also effective as aspects of the present invention.

Advantageous Effect of Invention

According to the present invention, an imaging apparatus can be calibrated with high accuracy with reduced man-hours.

BRIEF DESCRIPTION OF DRAWINGS

FIG. 13 depicts diagrams for describing systems of information obtained by the feature point information in the present embodiment.

FIG. 14 is a flowchart illustrating a processing procedure by which a calibration section acquires extrinsic parameters in S29 of FIG. 11.

FIG. 15 is a diagram for describing a positional relation between cameras and the chart for a case where a plurality of stereo cameras are included in the imaging apparatus in the present embodiment.

DESCRIPTION OF EMBODIMENT

Figure 1:
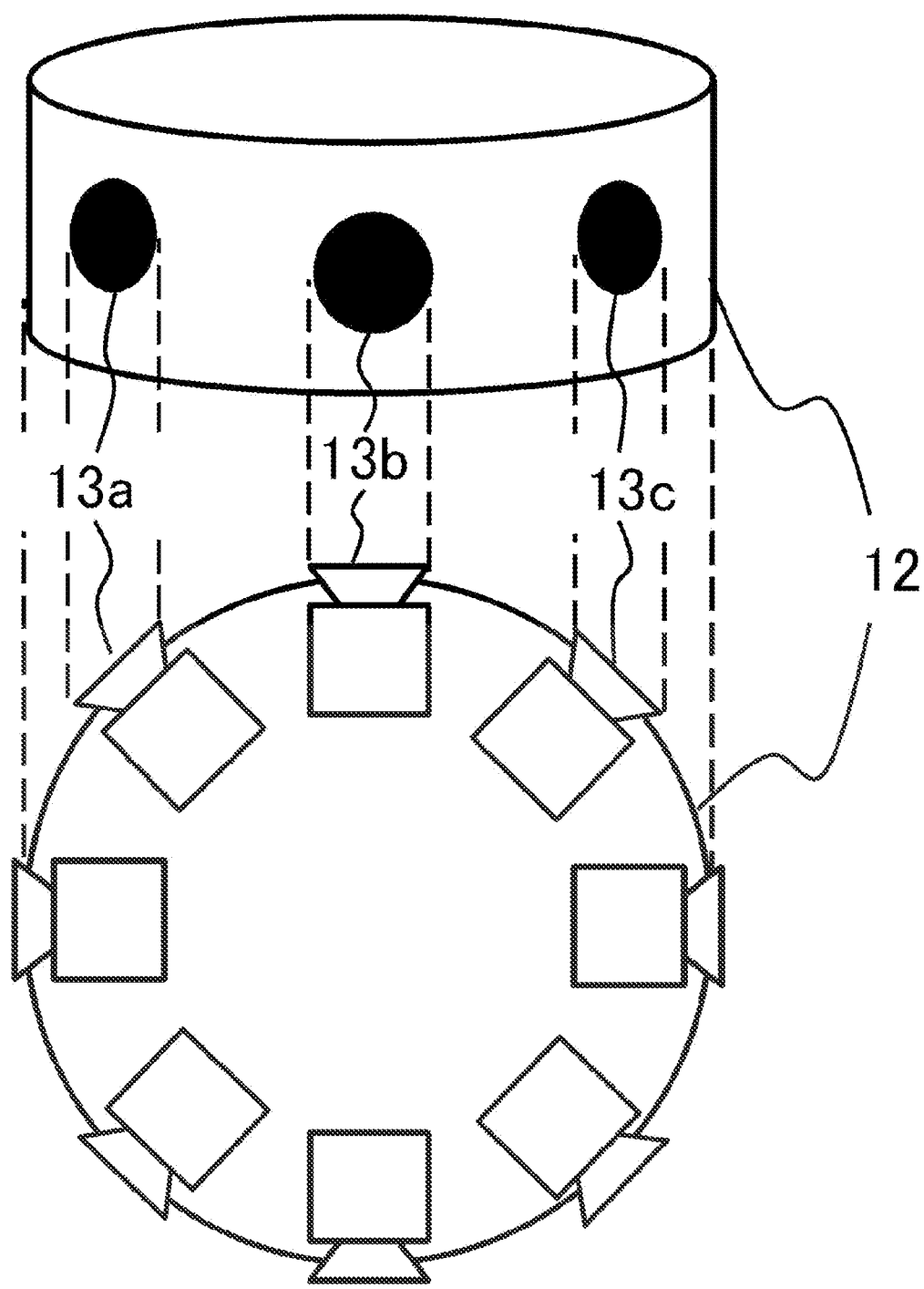
FIG. 1 is a diagram exemplifying an imaging apparatus to be calibrated in the present embodiment.

FIG. 1 exemplifies an imaging apparatus to be calibrated in the present embodiment. As illustrated in the perspective view in the upper section, an imaging apparatus 12 has a cylindrical shape in which imaging planes of a plurality of cameras 13a, 13b, 13c, . . . are arranged on a side surface of the imaging apparatus 12. As illustrated in the horizontal cross-sectional view in the lower section, the plurality of cameras 13a, 13b, 13c, . . . are fixed inside the imaging apparatus 12 such that their optical axes radiate out.

Each of the cameras 13a, 13b, 13c, . . . includes an imaging device and a mechanism. The imaging device captures an image of an object. The mechanism generates and outputs data of the captured image by performing a general process such as a demosaicing process on an output signal from the imaging device. The imaging device includes a visible-light sensor, such as a CCD (Charge Coupled Device) sensor or CMOS (Complementary Metal Oxide Semiconductor) sensor, which is used with a general digital camera or digital video camera, for example. The imaging apparatus 12 configured in this manner can capture a still image or a moving image with a 360° angle of view in the horizontal direction.

Figure 2:
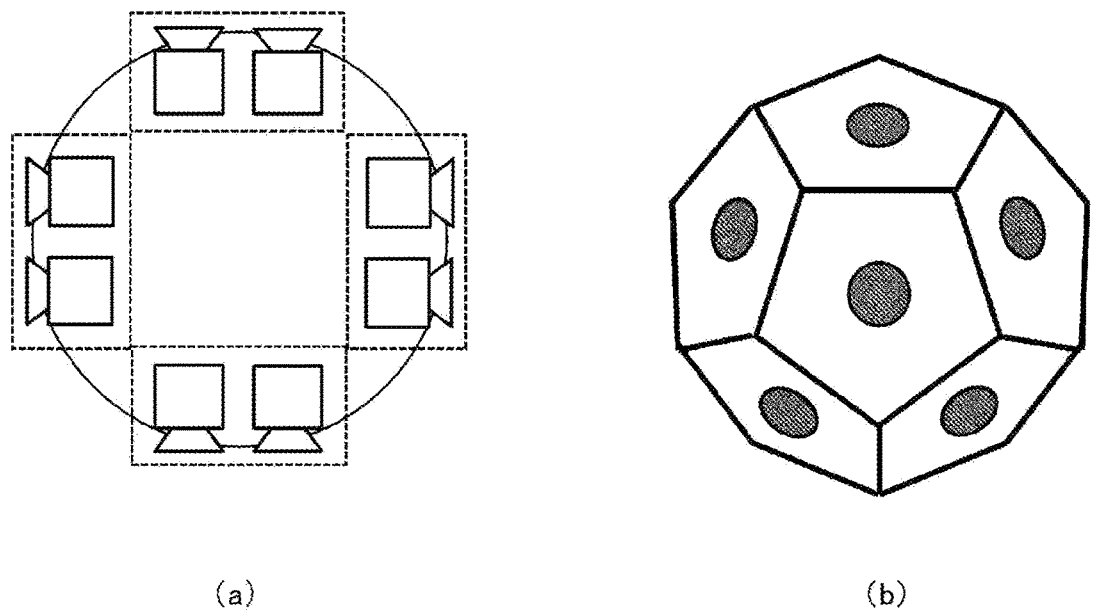
FIG. 2 depicts diagrams illustrating other examples of the imaging apparatus to be calibrated in the present embodiment.

FIG. 2 illustrates other examples of the imaging apparatus to be calibrated in the present embodiment. Illustrated in Subfigure (a) is an imaging apparatus including a combination of four stereo cameras provided in parallel and at the same height. This figure illustrates a cross-sectional view of this imaging apparatus. A technique of identifying the position of a subject using a stereo pair image captured by a stereo camera from a viewpoint with a known space is widely known. As illustrated in the figure, the imaging apparatus includes the plurality of stereo cameras fixed such that their optical axes radiate out. Such an imaging apparatus can not only capture a 360° wide-angle image, as is the case with the imaging apparatus 12 illustrated in FIG. 1, but also acquire the position of the subject.

It is noted that it is also possible to obtain similar information by replacing the cameras 13a, 13b, 13c, . . . with infrared sensors in the configuration illustrated in FIG. 1 and providing an infrared irradiation mechanism that is not illustrated in the figure. A technique of detecting the reflection of irradiated infrared light and identifying the position of the subject on the basis of the time difference or phase difference between the irradiated light and the reflected light is known as TOF (Time Of Flight). Subfigure (b) illustrates a perspective view of an imaging apparatus in which an imaging plane of each of a plurality of cameras is provided on each face of a dodecahedron. The imaging apparatus configured in this manner can obtain a whole-sky image without distinguishing between the horizontal and vertical directions.

An imaging apparatus to be calibrated in the present embodiment includes a plurality of cameras whose optical axes are not parallel, as exemplified in FIGS. 1 and 2. As far as this is concerned, there is no limitation to the number and arrangement of the cameras, the angle of view as a whole, and whether or not cameras provided in parallel and at the same height are included. Hereafter, such imaging apparatuses will be collectively referred to as the "imaging apparatus 12." A wide-angle image is obtained by stitching together the images in a plurality of orientations captured by the respective cameras of the imaging apparatus 12 according to their angles of view. If this is used as a source image for display, it is possible to realize content in which the image can be viewed from a desired viewpoint.

For example, displaying the source image in a field of view that corresponds to the movement of the head of a user wearing a head-mounted display can make the user feel immersed in the image world. By distributing such video content via a network, it is also possible to easily create a situation as if the user were in various locations around the world. Further, if the imaging apparatus 12 is mounted in a mobile object such as a mobile robot, a drone, or an in-vehicle camera, images in all orientations can be captured regardless of the direction of movement.

At this time, if a plurality of stereo cameras are introduced as illustrated in Subfigure (a) of FIG. 2 to identify the positions of subjects that are present in the surroundings, autonomous control can be performed to avoid collisions, and information regarding the surrounding situation can be accurately transmitted to a remote location. Augmented reality or mixed reality may be realized by displaying a captured image on which a virtual object is superimposed according to the position and movement of a subject. In this manner, the purpose of using the imaging apparatus 12 is not limited. However, even in any of the cases, accurate acquisition of camera parameters is an important key to improving the accuracy of processing results.

For example, assume a case where images captured by a plurality of cameras are stitched together. In this case, only slight deviation of the distances between the cameras, the orientations of the optical axes, the focal length of each camera, or the like from design values may make stitching become visible in some cases. Further, although a ranging technique using a stereo camera can obtain the position of a subject in a local coordinate system based on an imaging plane, relative positions and postures between a plurality of stereo cameras need to be accurately recognized in order to integrate the obtained results into a single coordinate system.

A typical single-lens or stereo camera captures an image of a chart pattern from a plurality of directions and acquires a camera parameter by analyzing the image. By contrast, the imaging apparatus 12 assumed in the present embodiment includes cameras, each of which has a different optical axis orientation. Therefore, the calculation used for the stereo cameras cannot be applied as it is. Further, as the number of cameras increases, the time and effort required for image capturing increase. Therefore, the present embodiment employs a chart including a plurality of planes with different angles. By repeating simultaneous image capturing with the plurality of cameras while changing the orientation of the imaging apparatus 12, camera parameters are acquired with high accuracy with reduced man-hours.

Figure 3:
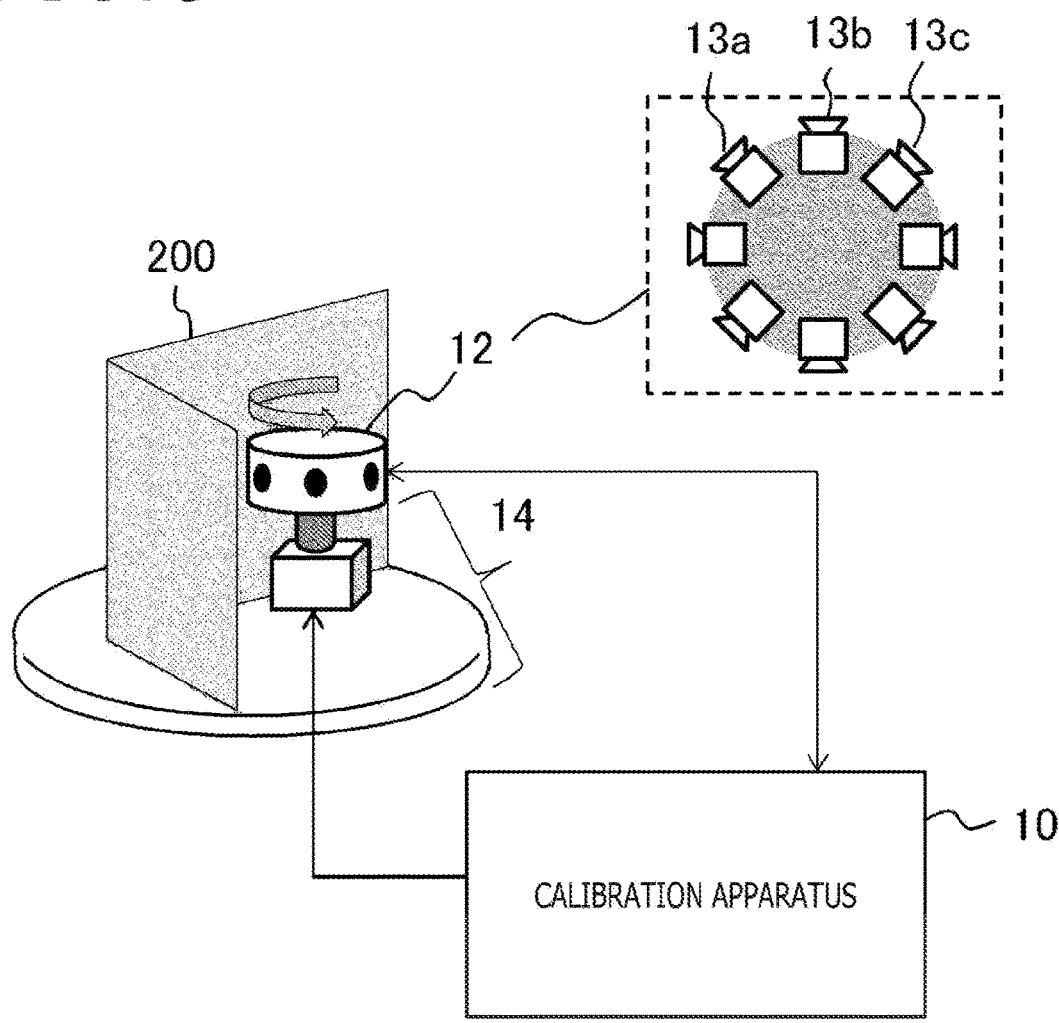
FIG. 3 is a diagram illustrating a configuration of a calibration system according to the present embodiment.

FIG. 3 illustrates a configuration of a calibration system according to the present embodiment. This calibration system includes the imaging apparatus 12 to be calibrated, a chart 200 for calibration, a jig 14, and a calibration apparatus 10. The jig 14 holds the imaging apparatus 12 and the chart 200 in a predetermined positional relation. The calibration apparatus 10 acquires camera parameters by using captured images of the chart 200. It is noted that, as illustrated in the upper-right cross-sectional view, the imaging apparatus 12 illustrated in the figure includes the plurality of cameras having the imaging planes provided on the cylindrical side surface illustrated in FIG. 1. However, as described above, there is no limitation to the shape of the imaging apparatus 12.

The calibration apparatus 10 acquires data of the images of the chart 200 for calibration captured by the imaging apparatus 12 and performs predetermined calculation on the basis of the data to derive intrinsic and extrinsic parameters. These are commonly known parameters. By using the parameters, the relation between a pixel m (u, v) in a captured image and a position M (X, Y, Z) in a world coordinate system is expressed as follows.

$$s\tilde{m}=A[R|t]\tilde{M}$$

$$\tilde{m}=[u,v,1]^T$$

$$\tilde{M}=[X,Y,Z,1]^T \quad \text{[Math. 1]}$$

Here, "s" represents a scale factor, and "A" represents an intrinsic parameter matrix. [R|t] represents extrinsic parameters. The extrinsic parameters include a rotation matrix R and a translation vector t that are used for transforming the world coordinate system into a camera coordinate system. The intrinsic parameter matrix A is expressed as follows.

$$A = \begin{bmatrix} fk_u & 0 & u_0 \\ 0 & fk_v & v_0 \\ 0 & 0 & 1 \end{bmatrix} \quad \text{[Math. 2]}$$

Here, "f" represents a focal length, $k_u$ and $k_v$ represent horizontal and vertical scale factors of an image plane, and $(u_0, v_0)$ represent position coordinates of an optical axis on the image plane. It is noted that skew distortion is assumed to be zero in the above equation.

Moreover, in a case where lens-induced radial distortion or lens-induced circumferential distortion is taken into consideration, a point at position coordinates (x, y) centered on the optical axis in the captured image is displaced, for example, to a point at position coordinates (x', y') by approximate equations below.

$$x'=(1+k_1r^2+k_2r^4)x+2p_1xy+p_2(r^2+2x^2)$$

$$y'=(1+k_1r^2+k_2r^4)y+p_1(r^2+2y^2)+2p_2xy$$

Here, $$r^2=x^2+y^2$$

Further, k1 and k2 represent parameters related to radial distortion, and p1 and p2 represent parameters related to circumferential distortion. These parameters are collectively called distortion coefficients.

The calibration apparatus 10 obtains the intrinsic and extrinsic parameters including the distortion correction coefficient and the like such that images of feature points in the captured image appear at the positions that reflect the original positions in a three-dimensional space. Hereinafter, these parameters will be occasionally collectively referred to as a "camera parameter." An existing technique suffices for a basic algorithm for a process of deriving the camera parameter. In particular, the Zhang's method described in NPL 1 can be employed. That is, images of feature points depicted on the chart 200 are extracted from the captured image to obtain the position coordinates thereof. Initial values of the intrinsic parameters are then obtained on the basis of the obtained position coordinates and the positions of the feature points in the three dimensions, and a nonlinear optimization process called bundle adjustment is performed to finally determine the intrinsic and extrinsic parameters.

Meanwhile, in the present embodiment, the chart 200 for calibration has a three-dimensional structure including a plurality of planes that are inclined relative to the optical axis of at least any of the cameras that capture images of the chart 200. The chart 200 illustrated in the figure is in an upright state such that one side of one of two planes on which chart patterns are depicted is attached to one side of the other one of the two planes so as to form an angle of θ(0<θ<180°) around an axis formed by these sides. However, as long as the first and second fields-of-view described later can be obtained simultaneously by adjacent cameras, there is no limitation to the number of planes constituting the chart 200.

In the chart 200, a chart pattern depicted on each plane on the imaging apparatus 12 side includes a checkered pattern and a maker. The checkered pattern includes rectangles arranged in a grid pattern, among which adjacent rectangles are alternatingly colored in black and white. The maker is used to identify the corresponding plane. In this case, a feature point is a vertex of each rectangle. However, the pattern depicted on the chart 200 is not limited to a checkered pattern. Any pattern may be employed as long as distributed feature points have such a shape and arrangement that the feature points can be easily detected by using an existing search method. For example, a circle grid obtained by arranging black circles horizontally and vertically may be employed.

The jig 14 holds both the imaging apparatus 12 and the chart 200 such that the imaging apparatus 12 and the chart 200 have a predetermined posture and distance, and also changes the orientation of the imaging apparatus 12 such that each of all the cameras 13a, 13b, 13c, . . . of the imaging apparatus 12 can sequentially capture an image of the chart 200 in a predetermined field of view. In the case of the cylindrical imaging apparatus 12 illustrated in the figure, the jig 14 includes an actuator that supports a center portion of the cylinder and rotates the imaging apparatus 12 around the central axis. This allows each camera to sequentially assume a similar posture relative to the chart 200 and capture an image of the chart 200 in the same field of view.

However, the shape and operation of the jig 14 are not limited and are optimized according to the shape of the imaging apparatus 12, the arrangement of the cameras, and the like. The calibration apparatus 10 transmits a control signal to the jig 14 to perform control so as to change the orientation of the imaging plane of each camera until the imaging plane assumes a predetermined posture relative to the chart 200 and pause when the imaging plane assumes the predetermined posture. Further, the calibration apparatus 10 also transmits a control signal to the imaging apparatus 12 to cause the imaging apparatus 12 to capture an image of the chart 200 at the pause timing. As a result, the image of the chart 200 captured by each camera in a similar field of view is acquired sequentially.

Figure 4:
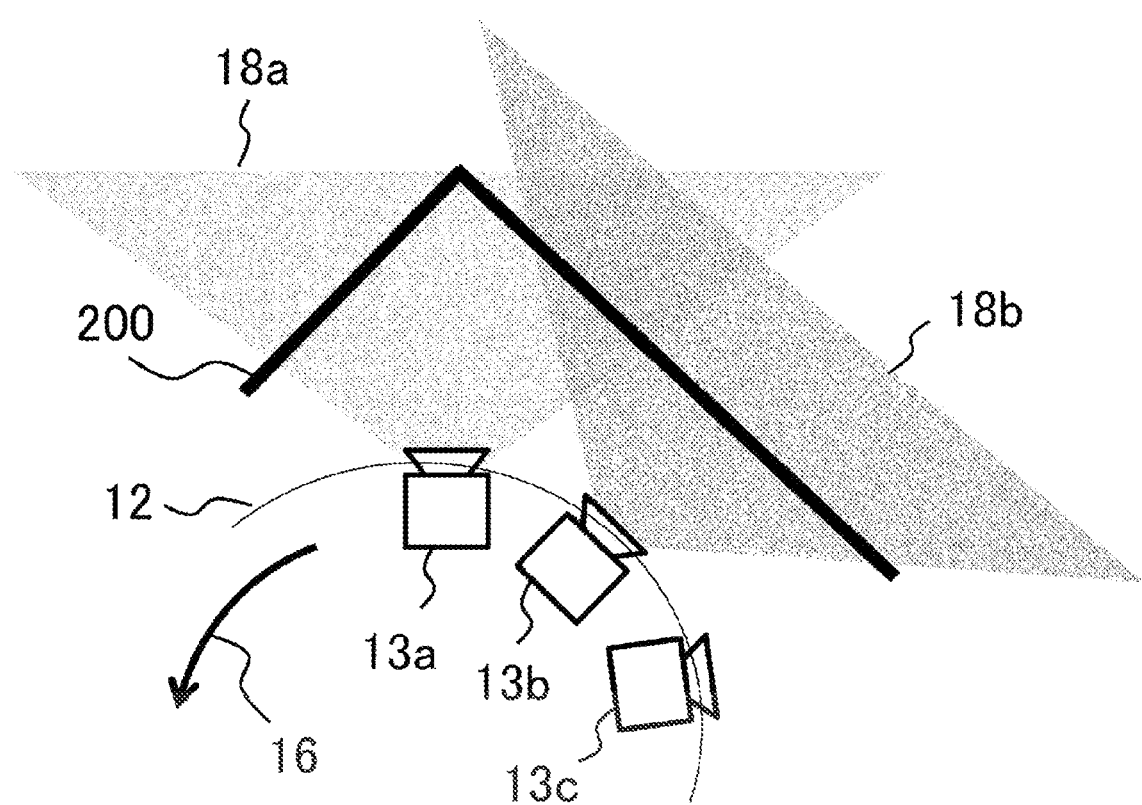
FIG. 4 is a diagram for describing a positional relation between cameras of the imaging apparatus and a chart in the present embodiment.

FIG. 4 is a diagram for describing the positional relation between the cameras of the imaging apparatus 12 and the chart. This figure illustrates an overhead view of the chart 200 and the three cameras 13a, 13b, and 13c among the cameras included in the imaging apparatus 12. For calibration, the calibration apparatus 10 uses a captured image of the two planes of the chart 200 included in a field of view and a captured image of one of the planes included in a field of view. In the example illustrated in the figure, the former is captured by the camera 13a having a field-of-view range 18a, while the latter is captured by the camera 13b having a field-of-view range 18b.

Hereinafter, the former field of view will be referred to as a "first field-of-view" and the latter field of view will be referred to as a "second field-of-view." The two planes of the chart 200 included in the first field-of-view are inclined relative to the optical axis of the camera 13a that captures an image of these planes. Preferably, a single plane included in the second field-of-view is approximately directly opposite the camera 13b that captures an image of this plane. However, there is no particular limitation to the relation between this single plane and the camera 13b. The image captured in the first field-of-view is used to acquire the intrinsic parameters of the camera that has captured this image. Further, the image captured in the second field-of-view and an area representing an image of the plane common to the second field-of-view within the image captured in the first field-of-view are used to acquire the extrinsic parameters of the two cameras that have captured the images.

Rotating the imaging apparatus 12 by the jig 14, as indicated by, for example, an arrow 16 next causes the cameras 13b and 13c to respectively reach the positions of the first and second fields-of-view. Therefore, the next images are captured by these cameras. In this manner, each time two cameras adjacent to each other reach their respective positions that satisfy the above conditions, the processes of stopping the rotation of the imaging apparatus 12 and capturing images of the chart 200 are repeated. Eventually, captured images of the first and second fields-of-view captured by all the cameras can be obtained. Taking an example of the imaging apparatus 12 including eight cameras 0 to 7, all images can be acquired by performing image capturing eight times as follows. Here, the "sequence number" refers to the identification number that identifies each round of image capturing.

TABLE 1

| Sequence Number | First Field-of-View | Second Field-of-View |
|---|---|---|
| 0 | Camera 0 | Camera 1 |
| 1 | Camera 1 | Camera 2 |
| 2 | Camera 2 | Camera 3 |
| 3 | Camera 3 | Camera 4 |
| 4 | Camera 4 | Camera 5 |
| 5 | Camera 5 | Camera 6 |
| 6 | Camera 6 | Camera 7 |
| 7 | Camera 7 | Camera 0 |

As described above, the image of the first field-of-view captured in each sequence is used to obtain the intrinsic parameters of the corresponding one of the cameras 0 to 7. Further, the image of the first field-of-view and the image of the second field-of-view captured in each sequence are used to obtain the extrinsic parameters of the adjacent cameras, that is, the cameras 0 and 1, 1 and 2, 2 and 3, . . . . If the position and posture relation between the adjacent cameras can be obtained, the positions and postures of all the cameras relative to one camera serving as a reference can be obtained. It is noted that, if the number of cameras is n, the intrinsic parameters of all the cameras and the extrinsic parameters between the cameras can be obtained by at least capturing an image in the first field-of-view n times and, at the same time, capturing an image in the second field-of-view n−1 times.

Further, as described above, as long as the captured images of the first and second fields-of-view can be obtained simultaneously, there is no limitation to the number of planes constituting the chart 200. Increasing the number of planes can decrease the number of times of image capturing. Further, the above conditions for the first and second fields-of-view are minimum requirements, and other planes of the chart 200 and the like may also be captured in the image. In some cases, the first field-of-view may include three planes, one of which is included in the second field-of-view of an adjacent camera, while another plane is included in the second field-of-view of an adjacent camera on the opposite side.

Figure 5:
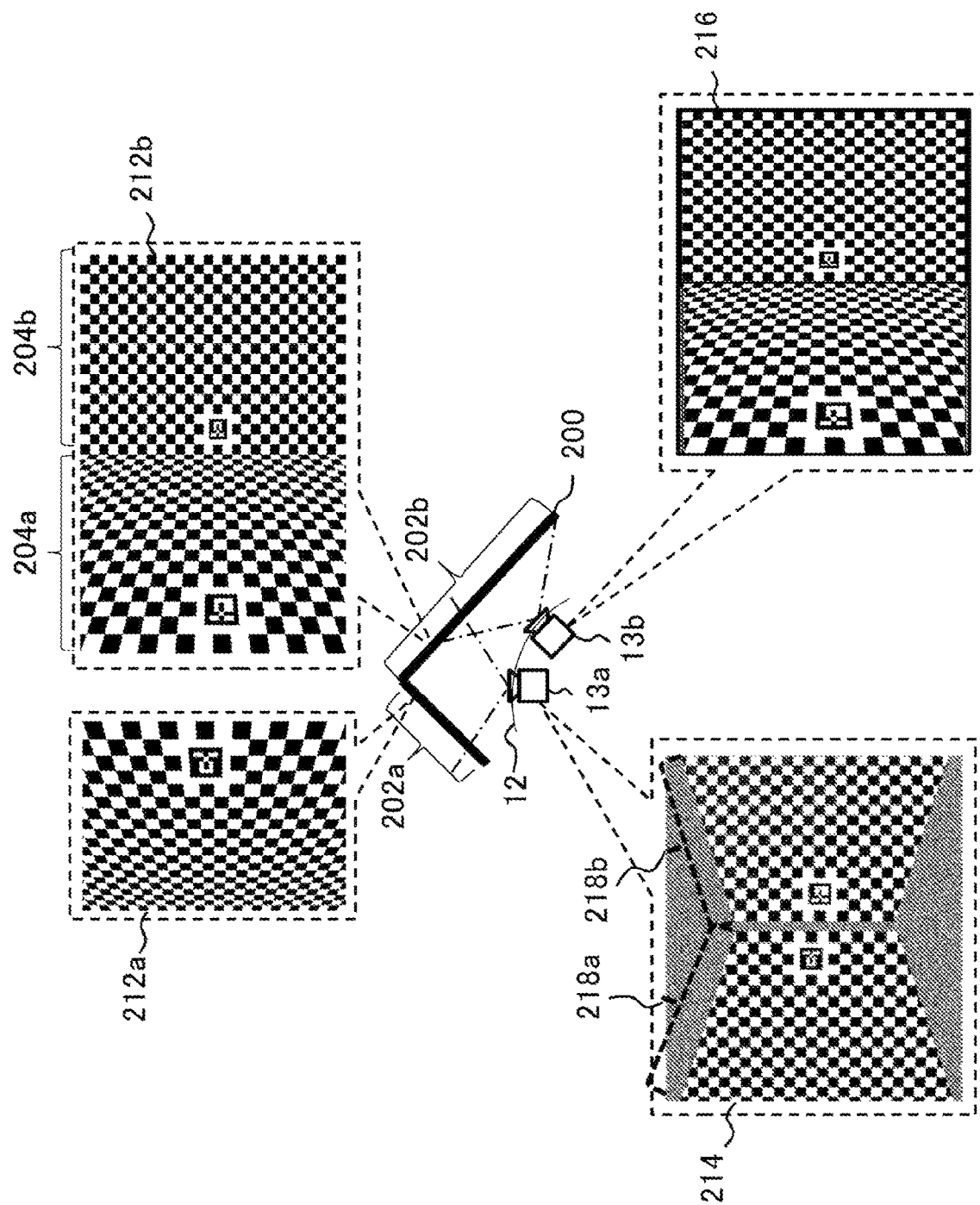
FIG. 5 is a diagram for describing chart patterns depicted on the chart in the present embodiment.

FIG. 5 is a diagram for describing chart patterns depicted on the chart 200. The upper section of the figure illustrates the chart patterns depicted on the two surfaces of the chart 200. The middle section illustrates the positional relation between the chart 200 and the imaging apparatus 12. As illustrated herein, a chart pattern 212a is depicted on a plane 202a and a chart pattern 212b is depicted on a plane 202b. An image of the plane 202a is captured in the first field-of-view. An image of the plane 202b is in common captured in the first and second fields-of-view. An area 204a of the chart pattern 212b is included in the first field-of-view.

The lower section of the figure illustrates how the chart patterns are observed in the first field-of-view from the camera 13a and the second field-of-view from the camera 13b. In a first field-of-view 214, the two planes 202a and 202b of the chart 200 are observed simultaneously. That is, images 218a and 218b correspond to the planes 202a and 202b, respectively. These planes have a range in the depth direction relative to the imaging plane of the camera 13a. Thus, in a case where the chart pattern represents a checkered pattern itself, deeper patterns appear to be smaller in size. In this case, the search accuracy of the corners of squares, which are feature points, depends on their positions.

In the present embodiment, therefore, as illustrated in the figure, in order that the positions of the feature points apparently uniformly appear in the first field-of-view 214 in both vertical and horizontal directions, the original checkered pattern is subjected to projective transformation that is the inverse of projective transformation produced according to the distance between the imaging plane and the plane. In the example illustrated in the figure, the chart pattern 212a is depicted in perspective such that the squares of the checkered pattern are maximized at the right end, which is farthest from the imaging plane. Further, in the chart pattern 212b, the area 204a that is included in the first field-of-view is depicted in perspective such that the squares of the checkered pattern are maximized at the left end, which is farthest from the imaging plane.

Since the distance from the imaging plane of the camera 13a changes linearly relative to the horizontal axis of the chart pattern, the chart pattern illustrated in the figure can be easily generated from a general checkered pattern by using a homography matrix described later. This configuration enables capturing of an image of figures of equal size evenly aligned in both vertical and horizontal directions despite the fact that these figures are at different distances in the real space. This uniforms the detection accuracy of the feature points, making it possible to acquire the parameter of the camera 13a by single image capturing.

It is noted that the technique of using a chart having a plurality of planes forming a certain angle in the calibration of a single-lens camera or a stereo camera is disclosed in International Publication No. WO 2018/235163 by the present inventor. By contrast, in the present embodiment, the plurality of planes included in the chart 200 are used such that each of the two cameras 13a and 13b with different optical axis orientations can simultaneously capture an image of the chart 200. That is, a second field-of-view 216 of the camera 13b includes the plane 202b common to the first field-of-view.

In the example illustrated in the figure, the angle between the two planes of the chart 200 is determined such that the plane 202b is approximately directly opposite the imaging plane of the camera 13b. In this case, in the chart pattern 212b depicted on the plane 202b, an area 204b, which is not included in the first field-of-view 214, depicts the checkered pattern as it is. Accordingly, the feature points uniformly aligned in both vertical and horizontal directions can be observed in at least part of the second field-of-view 216. In a case where the plane 202b and the camera 13b are not directly opposite to each other, the checkered pattern in the area 204b may also be subjected to inverse projective transformation according to the distance therebetween, as is the case with the area 204a.

It is noted that the more uniformly the apparent feature points in each field of view are arranged, the more uniform the detection accuracy becomes, but there is no intention to create such an arrangement strictly. In other words, it is not necessary to strictly define the angles between the cameras 13a and 13b and the respective planes 202a and 202b of the chart 200 or to strictly transform the chart patterns accordingly. For example, in the image of the chart pattern 212b captured by the camera 13b, feature points are not arranged perpendicularly in the image of the area 204a, but the feature points can be detected even in this area and used for deriving the camera parameter.

Figure 6:
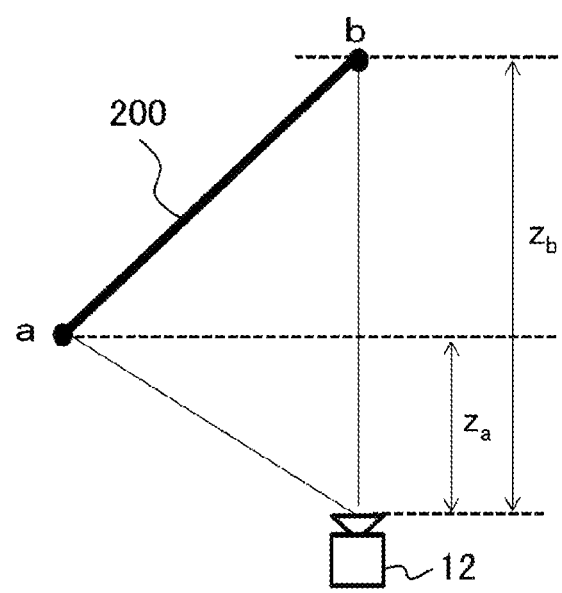
FIG. 6 is a diagram for describing a method for generating the chart pattern illustrated in FIG. 5.
Figure 7:
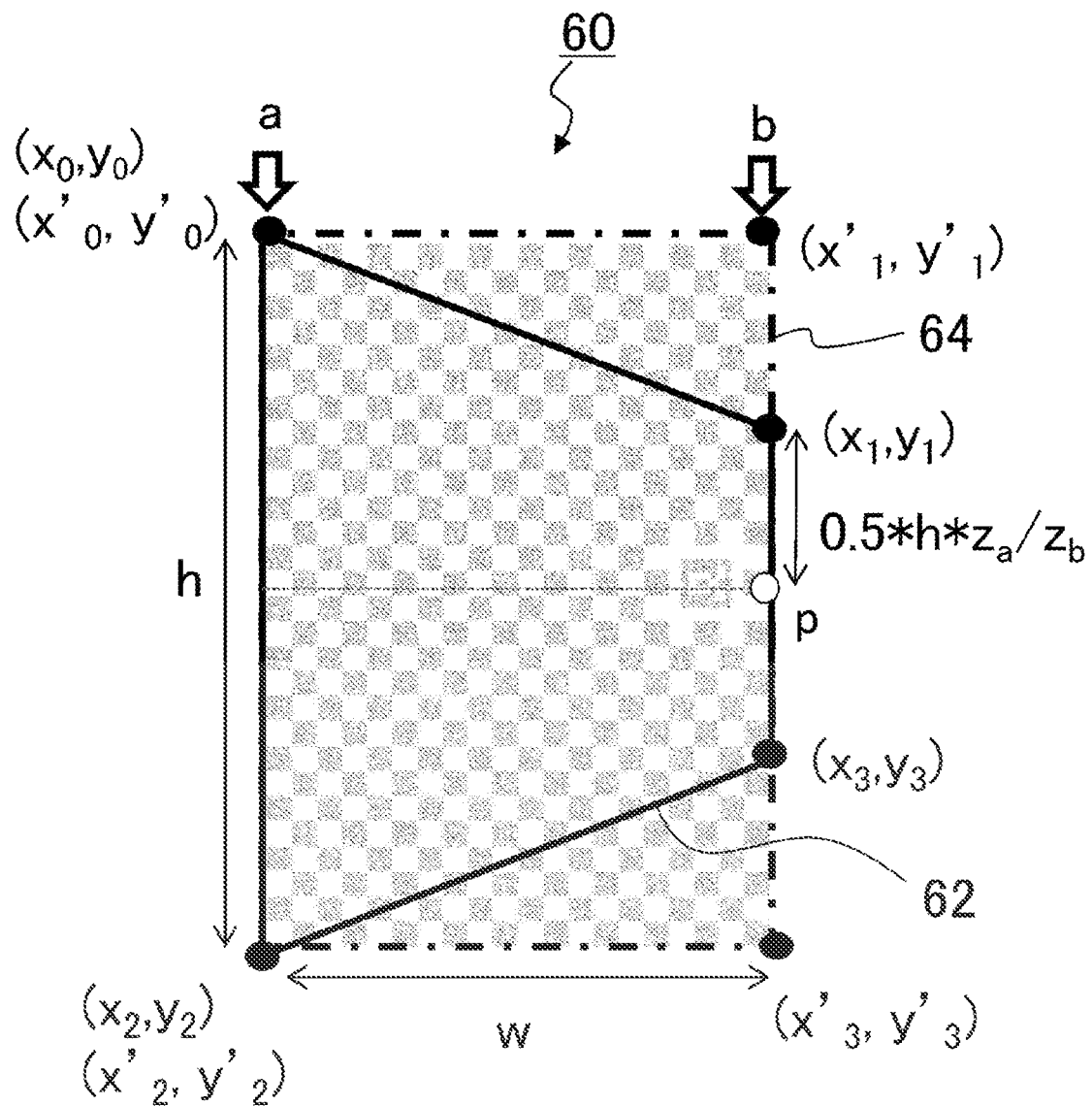
FIG. 7 is a diagram for describing a method for generating the chart pattern illustrated in FIG. 5.

FIGS. 6 and 7 are diagrams for describing a method for generating the chart pattern illustrated in FIG. 5. FIG. 6 schematically illustrates an overhead view of the plane 202a and the camera 13a in the chart 200. In the plane 202a, a distance $z_a$ in the optical axis direction from the imaging plane of the camera 13a to the closest spot a and a distance $z_b$ in the optical axis direction to the farthest spot "b" are determined by the shape of the chart 200 and the design of the jig 14.

Since an apparent scale of the spot "b" is $z_a/z_b$ times that of the spot "a," the size of the spot "b" in the chart pattern is multiplied by the reciprocal of $z_a/z_b$, so that patterns at "a" and "b" apparently become the same size. It is noted that the illustrated example is simplified for the sake of description. In a strict sense, a more optimal transformation parameter can be obtained by performing perspective projection in consideration of the relation between the position and the posture of the camera 13a, the angle of view and lens distortion of the camera, and the like and making adjustments while calculating the shape of the pattern possibly depicted in a captured image.

FIG. 7 illustrates the virtual geometric shapes of an untransformed chart pattern and a transformed chart pattern. In a chart pattern plane 60 illustrated in the figure, the spot "a" illustrated in FIG. 6 corresponds to the left side, and the spot "b" illustrated in FIG. 6 corresponds to the right side. The height of the chart pattern is h, its width is w, and the upper left of the chart pattern is the origin of the pattern plane. Projective transformation of an image to an image on a different plane is generally called homography. The homography matrix, which is a transformation parameter, can be determined by association information relating to four points before and after transformation.

This example focuses on the coordinates of four vertexes of the chart pattern. In the chart 200, as described above, the chart pattern needs to be expanded at a magnification that increases as the distance from the imaging plane increases, and expanded at a magnification of $z_b/z_a$ at "b," which is farthest from the imaging plane. Therefore, the transformed chart pattern remaining out of the untransformed chart pattern corresponds to a portion of a trapezoid 62 in which the height gradually decreases from a side "a" to a side "b" and the height at "b" is $h \cdot z_a/z_b$. It is noted that, although this example indicates a case where the optical axis exists at a point "p," which is the midpoint of the side "b," the shape of the trapezoid also varies depending on the position of the optical axis. Further, calculating a homography matrix for transforming the trapezoid 62 into an original rectangle 64 makes it possible to perform appropriate transformation on the whole image.

The coordinates $(x_n, y_n)$ (n=0, 1, 2, 3) of four vertexes of the untransformed trapezoid 62 can be expressed as follows.

$(x_0, y_0) = (0, 0)$ $(x_1, y_1) = (w, 0.5*h*(1 - z_a/z_b))$ $(x_2, y_2) = (0, h)$ $(x_3, y_3) = (w, 0.5*h*(1 + z_a/z_b))$

Meanwhile, the coordinates $(x'_n, y'_n)$ (n=0, 1, 2, 3) of four vertexes of the transformed rectangle 64 can be expressed as follows.

$(x'0, y'0) = (0, 0)$ $(x'1, y'1) = (w, 0)$ $(x'2, y'2) = (0, h)$ $(x'3, y'3) = (w, h)$

Assuming that a scaling factor is s, a homography matrix H is defined as follows.

$$H = \begin{pmatrix} h_{11} & h_{12} & h_{13} \\ h_{21} & h_{22} & h_{23} \\ h_{31} & h_{32} & 1 \end{pmatrix}$$ [Math. 3]

$$s \begin{pmatrix} x' \\ y' \\ 1 \end{pmatrix} = H \begin{pmatrix} x \\ y \\ 1 \end{pmatrix}$$

In a case where the vertex coordinates of the untransformed rectangle and transformed rectangle are defined as illustrated in the figure, the following equation is given.

$$\begin{pmatrix} x_1 & y_1 & 1 & 0 & 0 & 0 & -x_1 x'_1 & -y_1 x'_1 \\ 0 & 0 & 0 & x_1 & y_1 & 1 & -x_1 y'_1 & -y_1 y'_1 \\ x_2 & y_2 & 1 & 0 & 0 & 0 & -x_2 x'_2 & -y_2 x'_2 \\ 0 & 0 & 0 & x_2 & y_2 & 1 & -x_2 y'_2 & -y_2 y'_2 \\ x_3 & y_3 & 1 & 0 & 0 & 0 & -x_3 x'_3 & -y_3 x'_3 \\ 0 & 0 & 0 & x_3 & y_3 & 1 & -x_3 y'_3 & -y_3 y'_3 \\ x_4 & y_4 & 1 & 0 & 0 & 0 & -x_4 x'_4 & -y_4 x'_4 \\ 0 & 0 & 0 & x_4 & x_4 & 1 & -x_4 y'_4 & -y_4 y'_4 \end{pmatrix} \begin{pmatrix} h_{11} \\ h_{12} \\ h_{13} \\ h_{21} \\ h_{22} \\ h_{23} \\ h_{31} \\ h_{32} \end{pmatrix} = \begin{pmatrix} x'_1 \\ y'_1 \\ x'_2 \\ y'_2 \\ x'_3 \\ y'_3 \\ x'_4 \\ y'_4 \end{pmatrix}$$ [Math. 4]

When a matrix on the left of the left side is E and a matrix on the right side is F, the homography matrix H can be obtained as follows since E is a square matrix.

$$H = E^{-1} F$$

As illustrated in FIG. 5, in the chart 200, the checkered pattern to be depicted on the plane 202a is transformed by the homography matrix H to obtain the chart pattern 212a. Further, in the plane 202b, only the checkered pattern in the area 204a included in the first field-of-view 214 is transformed by the homography matrix H to obtain the chart pattern 212b.

In the present embodiment, as described above, feature points are extracted from an image of the chart pattern captured by each of the cameras 13a and 13b, and the association between the position coordinates (u, v) on the image and the position coordinates (X, Y, Z) on the chart 200 is acquired to obtain the intrinsic parameter matrix A and the extrinsic parameters R and t of each camera. For this purpose, along with the generation of the chart pattern, a projective transformation parameter that transforms indices given to all the feature points in the original chart pattern into the position coordinates of the feature points on the chart 200 is generated for each plane constituting the chart 200.

From the viewpoint that the position coordinates of the feature points on the chart 200 are position coordinates originally given on the chart, which is a real object, the position coordinates of the feature points on the chart 200 can be regarded as "position coordinates of a 3D (three dimensional) model" of the chart. However, the information required for calibration suffices as long as the position coordinates on each plane of the chart 200 are known. Practically, therefore, two-dimensional position coordinates suffice. This projective transformation parameter is also a homography for transforming the position coordinates in an index coordinate system into the position coordinates of a corresponding feature point in a transformed chart pattern. By performing such association, the position coordinates of an actually captured image of a feature point can be associated with the position coordinates of the 3D model through an index at the time of calibration.

Figure 8:
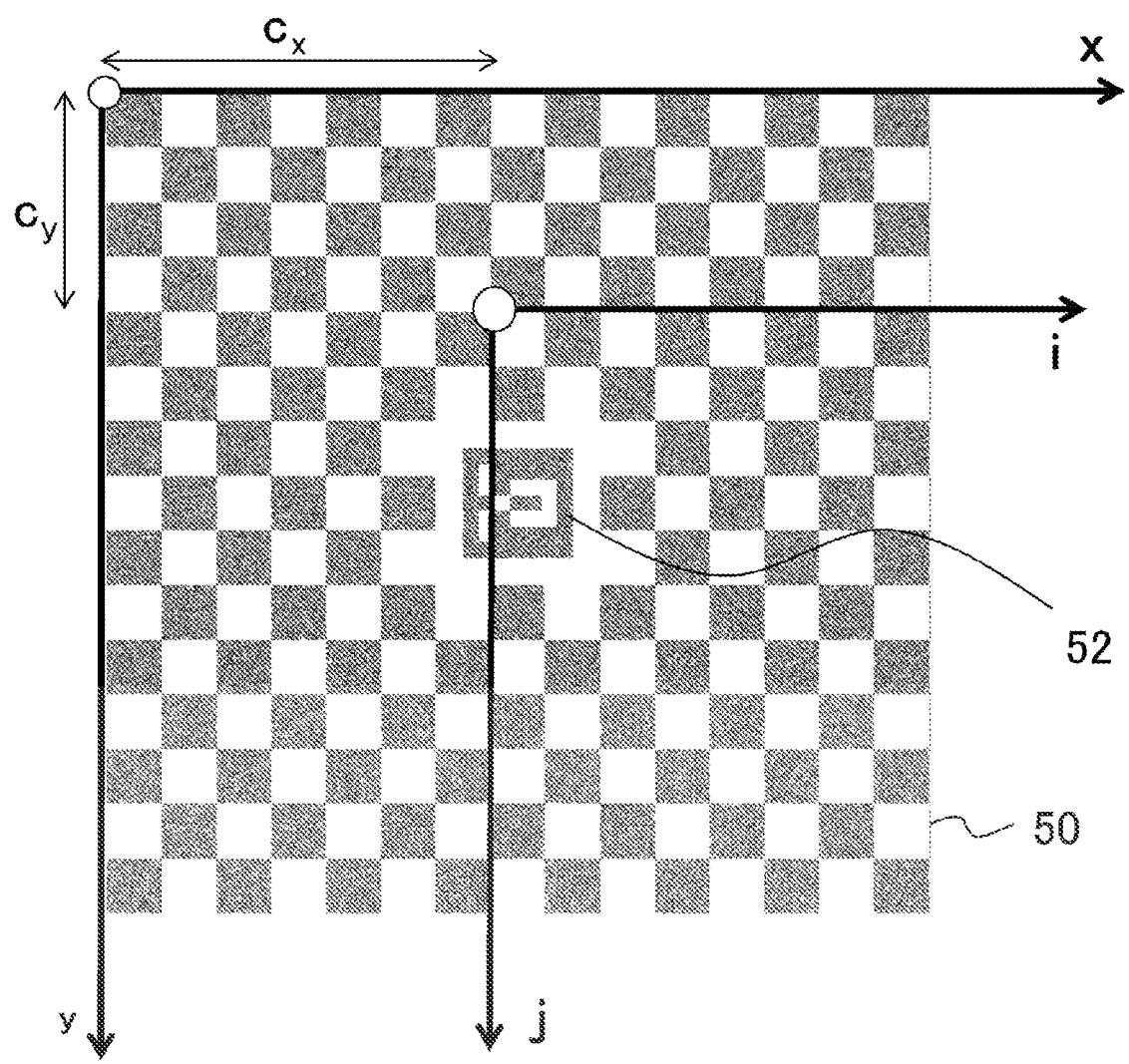
FIG. 8 is a diagram for describing indexes given to feature points of a chart pattern in the present embodiment.

FIG. 8 is a diagram for describing indexes given to feature points of a chart pattern. In the present embodiment, the vicinity of a marker 52 in a chart pattern 50 serves as a base point, based on which an index for identifying each feature point is given, and the position coordinates of the 3D model are made identifiable by using the index as a key. In the example illustrated in the figure, the upper left vertex of a square, which is located two squares above the marker 52, serves as the origin of a coordinate system of an index (i, j). Meanwhile, in a system of position coordinates (x, y) in which a pixel on the image plane is used as the unit, the upper left of the image serves as the origin.

In this example, the origin (x, y)=(0, 0) of the image coordinate system corresponds to (i, j)=(−7, −4) in the index coordinate system. Conversely, the origin (i, j)=(0, 0) of the index coordinate system is positioned at (x, y)=(7*gridSize, 4*gridSize) in the image coordinate system. Here, gridSize represents the number of horizontal and vertical pixels forming one square. For example, gridSize=64. At this time, the origin of the index coordinate system is positioned at (x, y)=(448, 256) in the image coordinate system. In this figure, this position is ($C_x$, $C_y$).

A generalized relation between the index (i, j) of a feature point and the position coordinates (x, y) of an image plane is as follows.

$x = i * \text{gridSize} + C_x$ $y = j * \text{gridSize} + C_y$

Further, the position coordinates (x, y) in the untransformed chart pattern 50 can be transformed into the position coordinates (x', y') in the transformed chart pattern by using the above-described homography matrix H.

Moreover, position coordinates (x", y", z") in which the length in the 3D model of the chart is used as the unit are obtained as follows from the relation between the pixel size and the actual length.

$x'' = x' * \text{scale}$ $y'' = y' * \text{scale}$ $z'' = 0$

Here, scale represents the width of one pixel area. If the unit of length is the millimeter, the value of scale is, for example, 0.25.

Therefore, it is possible to obtain the homography matrix as a parameter for transforming the index into the position coordinates of the 3D model by acquiring, for example, the index ($i_n$, $j_n$) (n=0, 1, 2, 3) of each of four vertexes of the chart pattern 50 and corresponding x and y components (x", y") that are the position coordinates of the 3D model in the chart 200 and making an equation for the homography matrix H in a similar manner described above.

Figure 9:
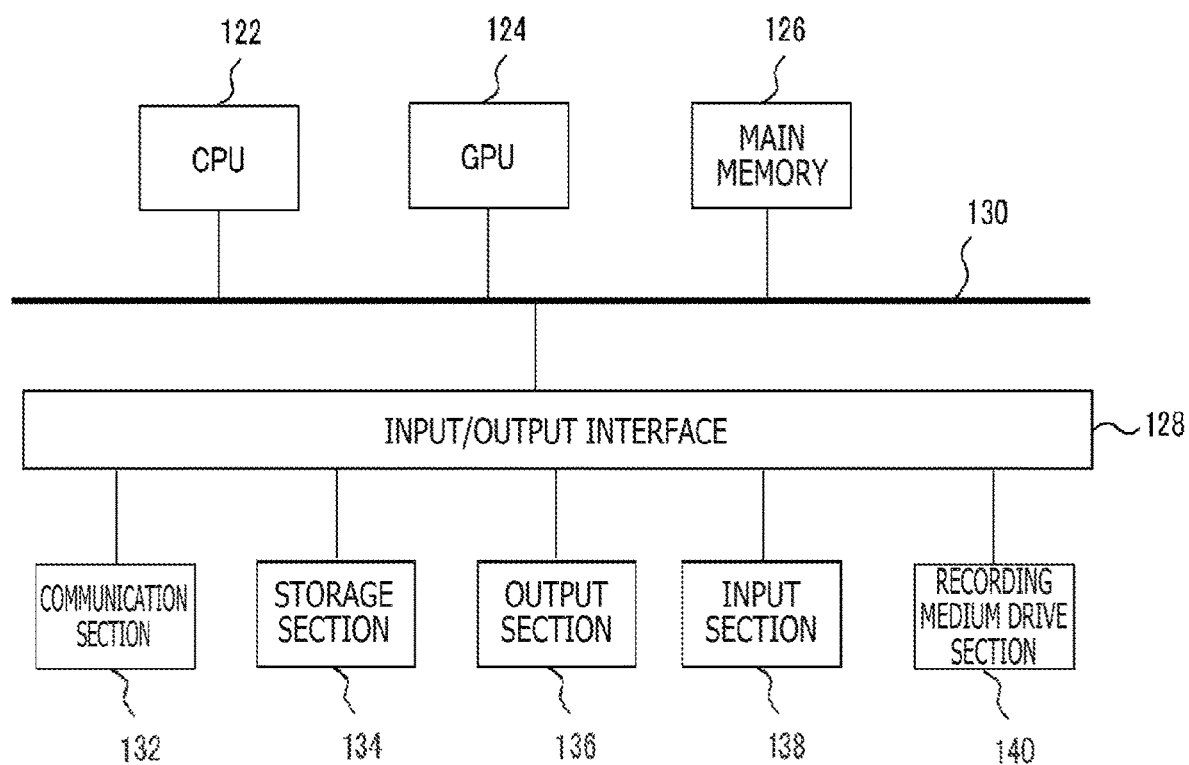
FIG. 9 is a diagram illustrating a configuration of an internal circuit of a calibration apparatus according to the present embodiment.

FIG. 9 illustrates a configuration of an internal circuit of the calibration apparatus 10. The calibration apparatus 10 includes a CPU (Central Processing Unit) 122, a GPU (Graphics Processing Unit) 124, and a main memory 126. On the basis of a program of an operating system, an application, or the like, the CPU 122 controls processing and signal transmission performed by constituent components inside the apparatus. The GPU 124 performs image processing. The main memory 126 includes a RAM (Random Access Memory) and stores programs and data necessary for processing.

Each of these sections is interconnected through a bus 130. An input/output interface 128 is further connected to the bus 130. A communication section 132, a storage section 134, an output section 136, an input section 138, and a recording medium drive section 140 are connected to the input/output interface 128. The communication section 132 includes a peripheral equipment interface such as a USB (Universal Serial Bus) or IEEE (Institute of Electrical and Electronic Engineers) 1394 and a network interface such as a wired or wireless LAN (Local Area Network). The storage section 134 includes a hard disk drive, a nonvolatile memory, and the like. The output section 136 outputs control signals to the imaging apparatus 12 or the jig 14. The input section 138 receives data from the imaging apparatus 12 or an input apparatus, not illustrated. The recording medium drive section 140 drives a magnetic disk and a removable recording medium such as an optical disk or a semiconductor memory.

Figure 10:
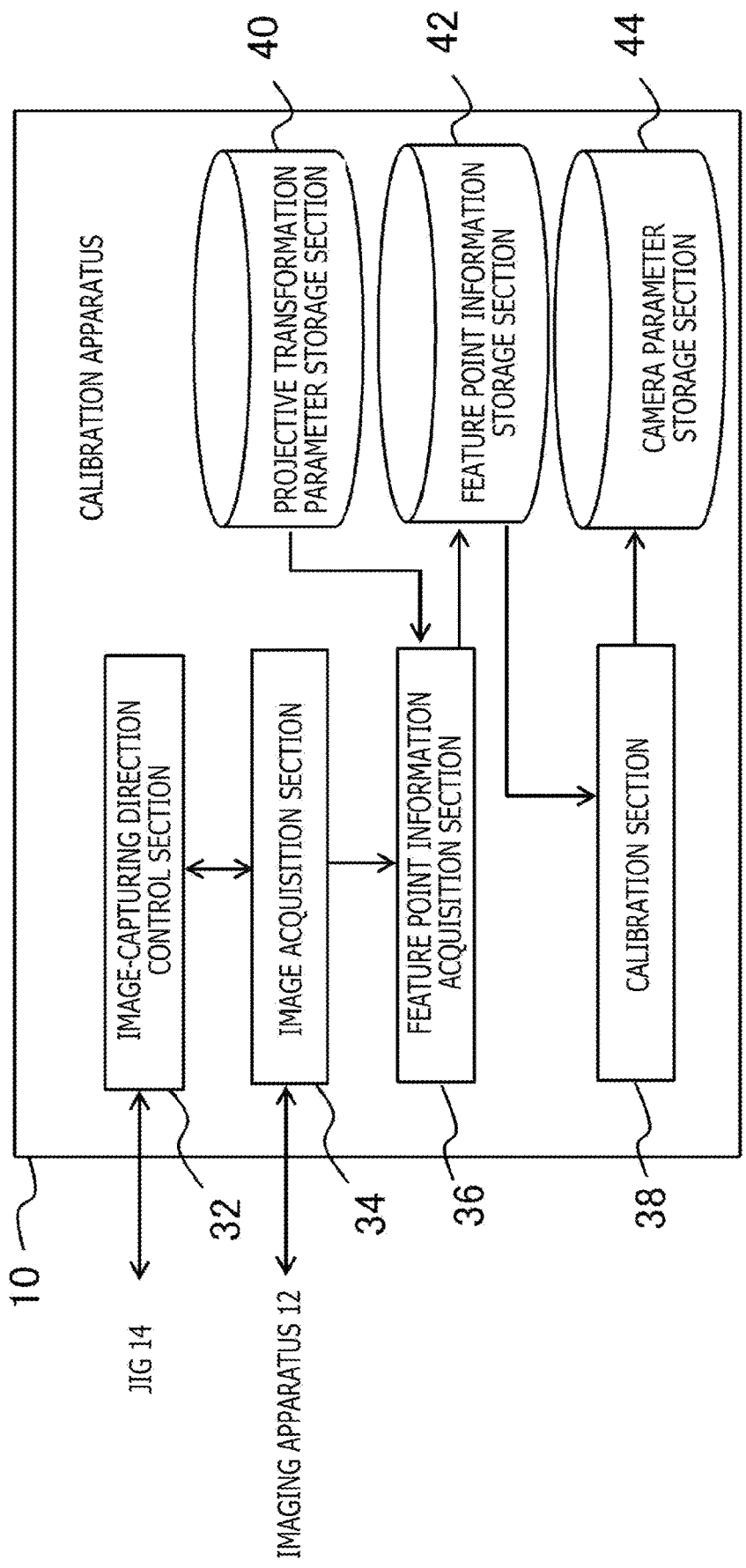
FIG. 10 is a diagram illustrating a configuration of functional blocks of the calibration apparatus according to the present embodiment.

FIG. 10 illustrates a configuration of functional blocks of the calibration apparatus 10. Each functional block illustrated in FIG. 10 can be implemented as hardware by the CPU 122, the GPU 124, the main memory 126, or the like illustrated in FIG. 9, and implemented as software by, for example, a computer program loaded into the main memory 126 from a hard disk or a recording medium. Therefore, it is to be understood by those skilled in the art that these functional blocks can be implemented in various forms by hardware only, by software only, or by a combination of hardware and software and are not to be limited to any of them.

The calibration apparatus 10 includes an image-capturing direction control section 32, an image acquisition section 34, a feature point information acquisition section 36, a projective transformation parameter storage section 40, a feature point information storage section 42, a calibration section 38, and a camera parameter storage section 44. The image-capturing direction control section 32 controls the directions of the cameras included in the imaging apparatus 12. The image acquisition section 34 acquires data of a captured image. The feature point information acquisition section 36 associates the position coordinates of each feature point in the captured image with the position coordinates of a corresponding feature point in a 3D model. The projective transformation parameter storage section 40 stores a transformation parameter used for the association. The feature point information storage section 42 stores association information relating to each feature point. The calibration section 38 performs calibration by using the association information. The camera parameter storage section 44 stores the camera parameter obtained as a result of calibration.

The image-capturing direction control section 23 is implemented by the CPU 122 and the output section 136 illustrated in FIG. 9 and controls the movement of the jig 14 such that the first and second fields-of-view are sequentially obtained by two cameras adjacent to each other among the plurality of cameras included in the imaging apparatus 12. That is, the image-capturing direction control section 23 repeatedly displaces and stops the imaging apparatus 12 to create the plurality of states defined in the table above, for example. A general technique used for robot operations or the like can be applied to control the actuator included in the jig 14.

The image acquisition section 34 is implemented by the CPU 122, the output section 136, and the input section 138 illustrated in FIG. 9. Each time adjacent cameras of the imaging apparatus 12 obtain the first and second fields-of-view by the image-capturing direction control section 32, the image acquisition section 34 transmits a control signal to cause each of these cameras to capture an image of the chart 200 and also acquires the data of each captured image. The projective transformation parameter storage section 40 is implemented by the main memory 126 illustrated in FIG. 9 and stores in advance the projective transformation parameters to be generated simultaneously with the generation of the chart patterns.

The feature point information acquisition section 36 is implemented by the CPU 122, the GPU 124, and the like illustrated in FIG. 9 and detects images of feature points and a marker from a captured image and associates the position coordinates of the image of each of the detected feature points with the position coordinates of a corresponding feature point in the 3D model for each plane identified by the marker. In this case, the feature point information acquisition section 36 identifies the index of each feature point and identifies the position coordinates of the 3D model from the index by using the transformation parameter stored in the projective transformation parameter storage section 40. In this manner, for each feature point, the position coordinates in the captured image are associated with the position coordinates of the 3D model of the chart 200. The feature point information storage section 42 is implemented by the main memory 126 illustrated in FIG. 9 and stores the association information relating to each of the acquired feature points.

The calibration section 38 is implemented by the CPU 122 and the like illustrated in FIG. 9 and identifies the camera parameter by using the association information relating to each feature point as input data. That is, the calibration section 38 uses a captured image of the first field-of-view to acquire the intrinsic parameters of the camera that has captured the image of the first field-of-view. An existing algorithm can be used for this processing. Further, the calibration section 38 also uses captured images of the first and second fields-of-view to acquire the extrinsic parameters between the cameras that have captured the images of the first and second fields-of-view. The camera parameter storage section 44 is implemented by the main memory 126 illustrated FIG. 9 and stores acquired camera parameters.

Alternatively, the parameters may be transmitted to the imaging apparatus 12. If the camera parameters are retained in the imaging apparatus 12, correction can be appropriately performed inside the imaging apparatus 12. Alternatively, the camera parameters may be transmitted to an information processing apparatus that performs information processing of a game or the like by using the images captured by the imaging apparatus 12. Accordingly, a plurality of images simultaneously captured can be stitched together after appropriate correction, and the position information of a subject can be represented in the world coordinate system.

Figure 11:
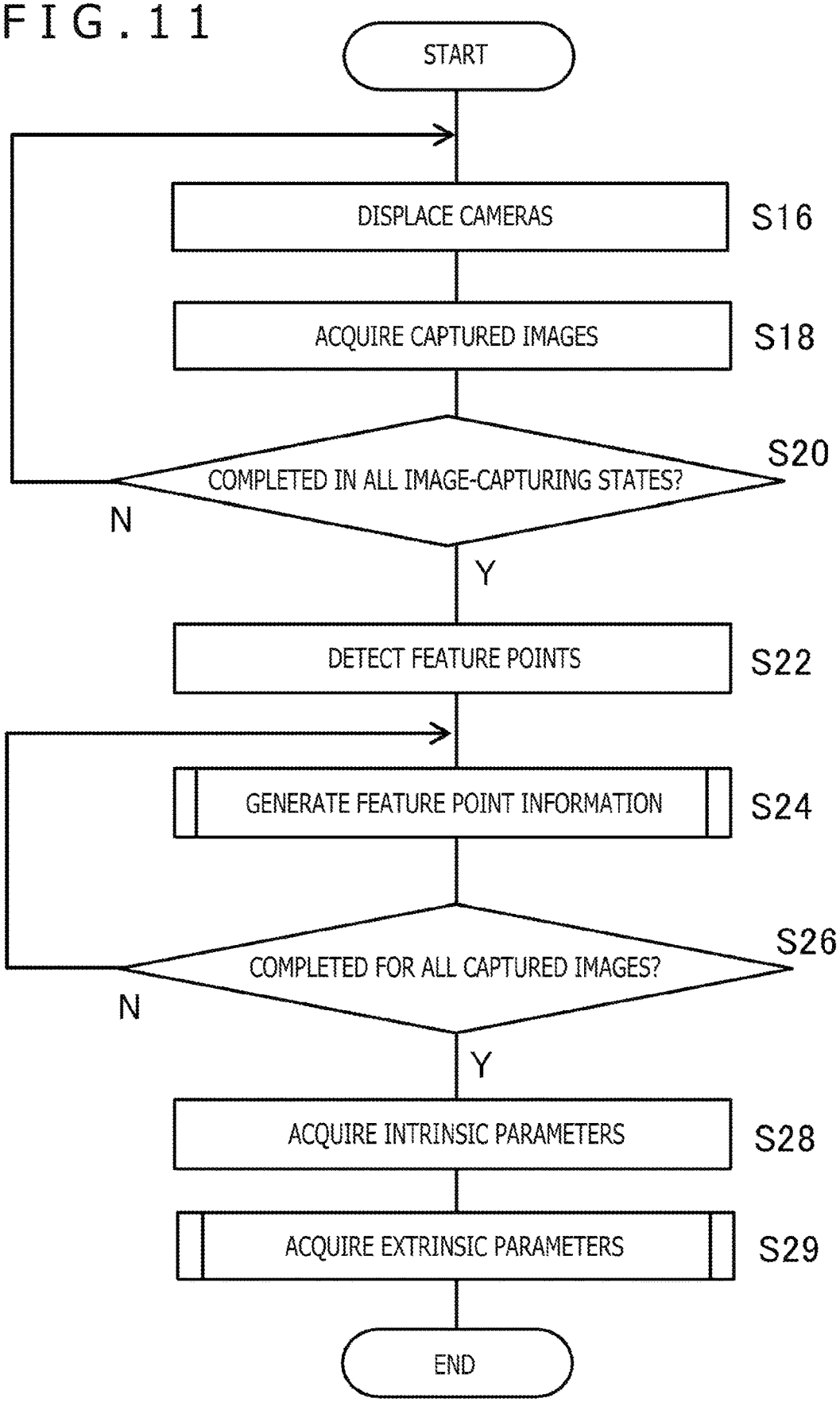
FIG. 11 is a flowchart illustrating a processing procedure by which the calibration apparatus according to the present embodiment performs calibration on the basis of captured images of the chart.

Next, the operation of the calibration apparatus 10 that can be implemented by the configurations described so far will be described. FIG. 11 is a flowchart illustrating a processing procedure by which the calibration apparatus 10 according to the present embodiment performs calibration on the basis of captured images of the chart 200. First, the image-capturing direction control section 32 displaces the cameras included in the imaging apparatus 12 such that two cameras adjacent to each other among these cameras obtain the first and second fields-of-view (S16). For example, the image-capturing direction control section 32 rotates the imaging apparatus 12 having a cylindrical shape such that the sequence number "0" in the table above can be obtained.

Next, the image acquisition section 34 causes each of the cameras that have obtained the first and second fields-of-view to capture an image of the chart 200 and acquire image data thereof (S18). The processes of S16 and S18 are repeated until image capturing in the predetermined states, such as the sequence numbers "0" to "7" in the above table, is completed (N in S20). It is noted that the cameras for obtaining the first and second fields-of-view may be single-lens cameras or multi-lens cameras. For example, in a case where each camera is implemented by a stereo camera, data of four captured images captured by two pairs of stereo cameras are acquired in S18.

Further, image capturing may be performed multiple times in the same state. At this time, the image acquisition section 34 can perform a noise reduction process by adding images obtained by performing image capturing multiple times. For example, the image acquisition section 34 adds images of 16 frames for each corresponding pixel to acquire an average value and generates an image having resulting average values as pixel values. After image capturing is completed in all states (Y in S20), the feature point information acquisition section 36 extracts images of feature points from the captured images (S22). Various methods for detecting the vertexes of squares in a checkered pattern as feature points have been put into practical use and any of them may be employed here.

If, for example, a method based on a Harris feature amount is used, feature points having a feature amount equal to or greater than a predetermined value are extracted as the vertexes (corners) of squares (refer to C. Harris and M. Stephens, "A combined corner and edge detector," Proceedings of the 4th Alvey Vision Conference, 1988, pp. 147 to 151). Alternatively, two edge brightness gradients may be used to acquire position coordinates (u, v) in a captured image with sub-pixel accuracy. For this processing, the cv::FindCornerSubPix( ) function or the like of OpenCV, which is a typical open source image processing software library, can be used.

Moreover, the feature point information acquisition section 36 obtains the index of each feature point on the basis of the positional relation with the image of the marker included in the chart pattern and obtains position coordinates on the chart 200 by using the projective transformation parameter. Accordingly, the feature point information acquisition section 36 generates feature point information in which the position coordinates of each feature point in the captured image are associated with the corresponding position coordinates of the 3D model of the chart 200 (S24). At this time, the feature point information acquisition section 36 identifies the plane or area constituting the chart 200 by the figure of the marker and reads the projective transformation parameter associated with the corresponding plane from the projective transformation parameter storage section 30 and uses the projective transformation parameter. This processing is repeated for all the acquired captured images (N in S26).

After the feature point information is generated for each of all the captured images (Y in S26), the calibration section 38 obtains the intrinsic parameters of each camera that has captured the image of the first field-of-view by using the feature point information obtained from each captured image of the first field-of-view (S28). An existing technique described in NPL 1 or the like can be employed as the method for acquiring the intrinsic parameters of each camera by using the captured image of a plurality of planes with different postures relative to the imaging plane.

Subsequently, the calibration section 38 then uses the feature point information obtained from each of the captured image of the first field-of-view and the captured image of the second field-of-view to acquire the extrinsic parameters of two cameras that have captured the images of the first field-of-view and the second field-of-view (S29). That is, the calibration section 38 obtains the relative rotation matrix and translation vector of both of the cameras. By performing the processes of S28 and S29 for the images obtained in all the image-capturing states, the calibration section 38 can obtain the intrinsic parameters of all the cameras constituting the imaging apparatus 12 and the extrinsic parameters between the cameras. The calibration section 38 stores the acquired parameters in the camera parameter storage section 44.

Figure 12:
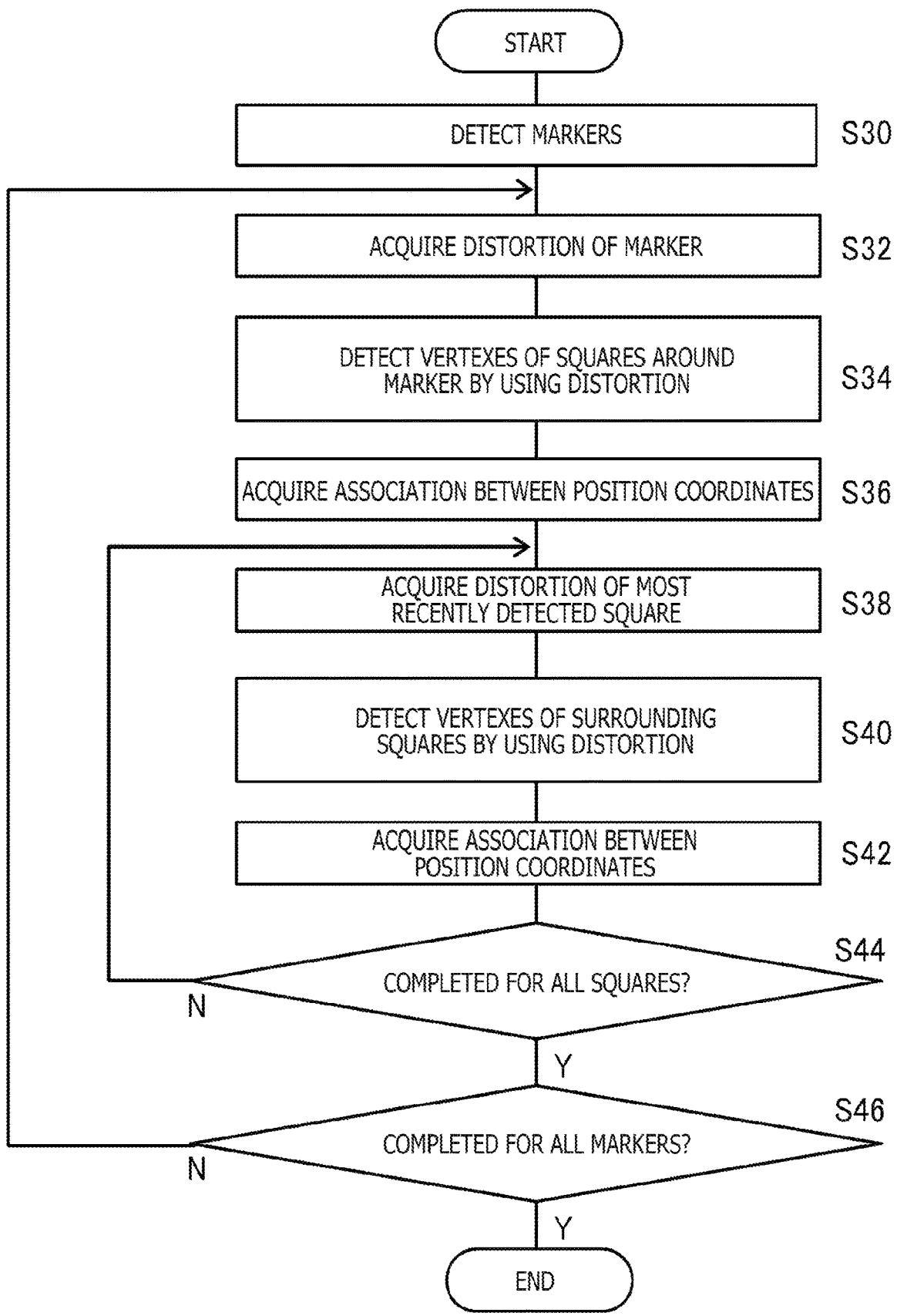
FIG. 12 is a flowchart illustrating a processing procedure by which a feature point information acquisition section generates feature point information in S24 of FIG. 11.

FIG. 12 is a flowchart illustrating a processing procedure by which the feature point information acquisition section 36 generates the feature point information in S24 of FIG. 11. The feature point information acquisition section 36 first detects an image of any marker in a captured image (S30). This detection process can be performed in a similar manner to an AR (Augmented Reality) technique that detects a marker depicted on a board or the like in the real world and draws a virtual object corresponding thereto in a captured image. For example, the ArUco Marker technique can be employed (refer to S. Garrido-Jurado et al. "Automatic generation and detection of highly reliable fiducial markers under occlusion" Pattern Recognition, Vol. 47, No. 6. 2014, June, pp. 2280 to 2292).

Next, for one of the detected markers, the feature point information acquisition section 36 acquires a parameter indicating distortion on the corresponding image (S32). Specifically, the feature point information acquisition section 36 acquires a homography matrix that transforms four vertexes of a rectangle having horizontal and vertical sides, which should originally appear as an image of the marker, into four vertexes of an actual image of the marker.

Subsequently, this marker is used as a base point to detect the vertexes of squares around the marker (S34). At this time, the four vertexes of a square shape, which should originally appear as an image of a square, are transformed by using the homography matrix acquired in S32, so that the approximate positions of the four vertexes can be identified in consideration of the distortion generated in the vicinity of the four vertexes. Then, a search for feature points effectively detected around the transformed position coordinates (e.g., within a range of approximately 0.5 pixels) is conducted. The indexes of the detected feature points are obvious from the positional relation with the marker. As a result, the indexes are associated with the position coordinates (u, v) of feature points in the captured image through this processing.

Next, the position coordinates (x", y", z") (it is noted that z"=0) of the 3D model are identified from the above-described indexes to associate the position coordinates (u, v) of the feature points with the position coordinates of the 3D model (x", y", z") (S36). The homography matrix for the plane corresponding to the marker, which is stored in the projective transformation parameter storage section 40, is used to transform the position coordinates. Next, a parameter indicating distortion of a square detected in S34 is acquired (S38). Specifically, as is the case with S32, the homography matrix for transforming the four vertexes of the square shape, which should originally appear as an image of the square, into the four vertexes of an actual image of the square is acquired.

Next, the above-described square is used as a base point to detect the vertexes of squares around the square (S40). At this time as well, as is the case with S34, the four vertexes of the square shape, which should originally appear as an image of the square, are transformed by using the homography matrix acquired in S38, so that the approximate positions of the vertexes of the squares can be identified in consideration of distortion generated in the vicinity of the four vertexes. A search is then conducted to detect feature points effectively detected around the transformed position coordinates. Accordingly, the indexes are associated with the position coordinates (u, v) of the feature points.

Next, as is the case with S36, the individual indexes (i, j) are transformed into the position coordinates of the 3D model (x", y", z") by using the homography matrix, which are then stored in association with the position coordinates (u, v) of the feature points in the captured image (S42). The processes of S38 to S42 are repeated for all the squares depicted on the same plane (N in S44). After the association information relating to the vertexes of all the squares, that is, the feature points, is generated (Y in S44), the processes of S32 to S44 are repeated for the plane or area corresponding to another marker detected in S30 (N in S46). After the feature point information is generated and stored for all the detected markers and thus all the planes in this manner, the processing ends (Y in S46).

A further specific example of this method of generating the feature point information is disclosed in the international publication described above. In the present embodiment, as illustrated in FIG. 5, the chart pattern 212b is depicted on the plane 202b, which is one of the planes of the chart 200. The chart pattern 212b includes the area 204b in which feature points are aligned in the horizontal and vertical directions and the area 204a in which feature points are not aligned in the horizontal and vertical directions. The processing is also similarly applied to a captured image of the second field-of-view including these areas. That is, the marker depicted in each area is used as a base point to search for feature points, so that the feature point information can be efficiently generated for the entire area.

FIG. 13 depicts diagrams for describing the systems of information obtained by the feature point information. As described so far, in the present embodiment, an image of the first field-of-view including the plurality of planes of the chart 200 (referred to as a "plane A" and a "plane B" in the figure) and an image of the second field-of-view including one plane (referred to as the "plane B" in the figure) among these planes are captured simultaneously. As illustrated in Subfigure (a), the feature point information obtained from the image of the first field-of-view indicates association between the position coordinates of the 3D models of the planes A and B and the position coordinates on the image captured by each of the cameras 0, 1, 2, . . . . By using this information, the intrinsic parameters of each camera can be obtained.

By contrast, the feature point information obtained from the image of the second field-of-view indicates association between the position coordinates of the 3D model of the plane B and the position coordinates on the image captured by each of the cameras 1, 2, . . . , and 0. From the image of the first field-of-view simultaneously captured here, the association between the position coordinates of the 3D model of the plane B and the position coordinates on the image captured by each of the adjacent cameras 0, 1, 2, . . . can also be obtained. Therefore, the rotation matrices and translation vectors relative to the plane B that can be acquired therefrom are integrated so that the relative rotation matrices and translation vectors of the adjacent cameras "0, 1," "1, 2," "2, 3," . . . as illustrated in Subfigure (b) can be obtained. As a result, one camera can be used as a reference to obtain the relative rotation matrices and translation vectors of all other cameras.

FIG. 14 is a flowchart illustrating a processing procedure by which the calibration section 38 acquires the extrinsic parameters in S29 of FIG. 11. From the feature point information storage section 42, the calibration section 38 first reads the feature point information associated with the 3D model of the plane (the plane B illustrated in FIG. 13) in common included in the first and second fields-of-view (S50). Next, the calibration section 38 uses the feature point information to obtain the rotation matrix and translation vector from the coordinate system of the plane of the chart to the coordinate system of each camera (S52). This processing itself can be performed as a general PnP (Perspective-n-Point) problem and the cv::solvePnP( ) function of OpenCV can be used, for example.

Here, the values obtained in S28 of FIG. 11 can be used as the intrinsic parameters. Accordingly, the rotation matrices $R_1$ and $R_2$ and the translation vectors $t_1$ and $t_2$ in the state in which one camera captures an image of one plane of the chart 200 from each of two directions are obtained for each of the cameras 0, 1, 2, . . . . Here, subscripts "1" and "2" correspond to the first field-of-view and the second field-of-view, respectively. Next, the calibration section 38 acquires the relative position and posture relation between adjacent cameras (S54).

The two rotation matrices $R_1(n)$ and $R_2(n)$ and the two translation vectors $t_1(n)$ and $t_2(n)$ obtained for a camera n can be used to obtain a rotation matrix Rn and a translation vector Tn from the camera n to a camera n+1 as follows.

$$Rn = R_2(n+1)*(R_1(n))^{-1}$$

$$tn = R_2(n+1)*(R_1(n))^{-1}*t_1(n)+t_2(n+1)$$

Here, the camera n+1 refers to the camera that is in the second field-of-view position when the camera n is in the first field-of-view position.

In this manner, if the relative rotation matrix and translation vector of the adjacent cameras can be obtained among all the cameras, one camera can be used as a reference to obtain the position and posture relation of all the other cameras. Accordingly, the images captured by individual cameras can be stitched together after appropriate corrections, and a wide-angle image with no visible boundary can be generated. As described above, this method can be applied to a plurality of stereo cameras or multi-lens cameras provided in parallel and at the same height.

FIG. 15 is a diagram for describing the positional relation between cameras and the chart for a case where a plurality of stereo cameras are included in the imaging apparatus 12. The imaging apparatus 12 in this figure includes a stereo camera 300a, which includes cameras "0" and "1," a stereo camera 300b, which includes cameras "2" and "3," and a stereo camera 300c, which includes cameras "4" and "5." However, the number of stereo cameras is not limited thereto, and the stereo cameras may be arranged in various ways. In the case of three stereo cameras, the orientations of the cameras are changed as illustrated in the figure, and image capturing is performed three times in the following order.

TABLE 2

| Sequence Number | First Field-of-View | Second Field-of-View |
| --- | --- | --- |
| 0 | Camera 0, 1 | Camera 2, 3 |
| 1 | Camera 2, 3 | Camera 4, 5 |
| 2 | Camera 4, 5 | — |

In this case, from the feature point information of an image captured by each stereo camera in the first field-of-view, the calibration section 38 first acquires the intrinsic parameters of each camera and the extrinsic parameters representing the relation between the paired cameras. The cv::stereoCalibrate( ) function or the like of OpenCV can be used as the method for obtaining the extrinsic parameters of the stereo cameras from images of the chart pattern captured from a plurality of directions.

The calibration section 38 further acquires the extrinsic parameters between the stereo cameras from the feature point information of each of the images of the first and second fields-of-view of the common plane of the chart 200 captured by the two adjacent stereo cameras. That is, in the sequence number "0" in the above table, the rotation matrix and translation vector between the camera 0 or the camera 1, which has captured the image in the first field-of-view, and the camera 2 or the camera 3, which has captured the image in the second field-of-view, are acquired. Further, in the sequence number "1," the rotation matrix and translation vector between the camera 2 or the camera 3, which has captured the image in the first field-of-view, and the camera 4 or the camera 5, which has captured the image in the second field-of-view are acquired.

The processing procedure may be similar to the one described with reference to FIG. 14. Accordingly, the relative rotation matrices and translation vectors between the adjacent stereo cameras 300a and 300b, and between the adjacent stereo cameras 300b and 300c can be obtained. Therefore, one camera can be used as a reference to obtain the position and posture relation of all the other cameras. From the captured image captured by each stereo camera, position information of a subject, which is depicted in this captured image, relative to the imaging plane can be acquired. As described above, since the relative position and posture relation between the stereo cameras can be obtained, pieces of local position information obtained by individual stereo cameras can be integrated to accurately generate position information over a wide range in a single three-dimensional coordinate system.

According to the present embodiment described above, in the calibration of the imaging apparatus including the plurality of cameras with different optical axis orientations, at least two of the plurality of cameras capture images of the chart, which includes the plurality of planes with different angles, from different directions. At this time, one of the cameras captures an image in the first field-of-view in which two planes of the chart is included, while the other camera captures an image in the second field-of-view in which one of the two planes is included, so that the intrinsic parameters of the former camera and the extrinsic parameters between the two cameras can be obtained simultaneously.

The orientation of the imaging apparatus or the chart is changed by the jig and the image of the first field-of-view is captured by each of all the cameras included in the imaging apparatus while the image of the second field-of-view is captured by its adjacent camera. Accordingly, the intrinsic parameters of all the cameras and the extrinsic parameters between the cameras can be obtained by a small number of image-capturing times. Further, among the patterns depicted on the chart, a pattern of the area that is included in the first field-of-view and has large inclination to the imaging plane is shaped such that perpendicularly and evenly arranged feature points can be obtained in a captured image. Accordingly, a search for feature points can be easily conducted with high accuracy.

With this configuration, even if the imaging apparatus includes cameras with different optical axis directions, intrinsic and extrinsic parameters can be acquired with high accuracy by a small number of image-capturing times. This makes it possible to generate a wide-angle image with high accuracy by stitching together images captured by individual cameras or to represent a subject in a single coordinate system with high accuracy by integrating pieces of three-dimensional information of the subject.

The present invention has been described above on the basis of the embodiment. The above-described embodiment is an exemplification, and it is to be understood by those skilled in the art that various modifications can be made to combinations of individual constituent components and individual processing processes in the embodiment and that such modifications also fall within the scope of the present invention.

INDUSTRIAL APPLICABILITY

As described above, the present invention is applicable to a calibration apparatus for an imaging apparatus, a chart for calibration, a system including them, and the like.

REFERENCE SIGNS LIST

10 Calibration apparatus
12 Imaging apparatus
14 Jig
32 Image-capturing direction control section
34 Image acquisition section
36 Feature point information acquisition section
38 Calibration section
40 Projective transformation parameter storage section
42 Feature point information storage section
44 Camera parameter storage section
122 CPU
124 GPU
126 Main memory
200 Chart

The invention claimed is:

1. A calibration apparatus for calibrating an imaging apparatus including a plurality of cameras with different optical axis orientations, the calibration apparatus comprising:
    an image acquisition section configured to acquire data of images of a chart captured from different directions by at least two cameras among the plurality of cameras, the chart including a plurality of planes forming a predetermined angle;
    a feature point information acquisition section configured to detect, from each of the images, images of feature points of a pattern depicted on the chart and generate feature point information in which position coordinates of the images of the feature points are associated with position coordinates of the feature points on the chart; and a calibration section configured to acquire a parameter including position and posture information between the cameras on a basis of the feature point information; wherein any one plane among the plurality of planes includes an area whose depicted pattern has been subjected to a projective transformation such that positions of the feature points uniformly appear in a field-of-view in at least one of vertical and horizontal directions despite being at different distances in real space, and an area whose depicted pattern is not subjected to the projective transformation.

2. The calibration apparatus according to claim 1, wherein the image acquisition section acquires data of an image of a first field-of-view, in which two planes of the chart with different angles are included, and an image of a second field-of-view, in which one of the two planes is included, which have been captured by cameras adjacent to each other, and the calibration section acquires, on a basis of the image of the first field-of-view, an intrinsic parameter of a camera that has captured the image of the first field-of-view, while acquiring, on a basis of the images of the first and second fields-of-view, extrinsic parameters of the cameras that have captured the images of the first and second fields-of-view.

3. The calibration apparatus according to claim 2, further comprising: an image-capturing direction control section configured to change an orientation of the imaging apparatus or the chart via a jig such that the plurality of cameras sequentially obtain the first and second fields-of-view.

4. The calibration apparatus according to claim 3, wherein the image-capturing direction control section changes the orientation of the imaging apparatus or the chart until all of the plurality of cameras obtain the first field-of-view, and at a timing when adjacent cameras have respectively obtained the first and second fields-of-view, the image acquisition section causes each of these cameras to capture an image of the chart.

5. The calibration apparatus according to claim 3, wherein the image-capturing direction control section rotates the imaging apparatus having a cylindrical shape such that directions of the plurality of cameras, which have optical axes radially provided on a side surface of the imaging apparatus, relative to the chart come full circle.

6. The calibration apparatus according to claim 2, wherein the image acquisition section acquires data of an image of the first field-of-view and an image of the second field-of-view that have been captured by stereo cameras adjacent to each other among a plurality of stereo cameras with different optical axis orientations included in the imaging apparatus, and the calibration section acquires, on a basis of the image of the first field-of-view, each intrinsic parameter of a stereo camera that has captured the image of the first field-of-view and extrinsic parameters between cameras of the stereo camera, while acquiring, on a basis of the images of the first and second fields-of-view, extrinsic parameters between any cameras that are each included in a different one of the stereo cameras.

7. The calibration apparatus according to claim 1, wherein at least part of the pattern depicted on the chart is obtained by subjecting a predetermined pattern to transformation corresponding to a change in a distance from an imaging plane of a camera that captures an image of the at least part of the pattern to a corresponding one of the planes, such that the predetermined pattern is obtained in a captured image.

8. A chart for calibration used to calibrate an imaging apparatus including a plurality of cameras with different optical axis orientations, the chart for calibration comprising:

a plurality of planes forming a predetermined angle, wherein any one plane among the plurality of planes includes an area whose depicted pattern has been subjected to projective transformation (1) according to angles of imaging planes of adjacent cameras that each simultaneously capture an image of the plane among the plurality of cameras, and (2) such that positions of feature points uniformly appear in a field-of-view in at least one of vertical and horizontal directions despite being at different distances in real space, and an area whose depicted pattern is not subjected to the projective transformation.

9. The chart for calibration according to claim 8, further comprising: a plane that includes only an area whose depicted pattern has been subjected to the projective transformation according to an angle of an imaging plane of one of the adjacent cameras.

10. A calibration method comprising:

by a calibration apparatus for calibrating an imaging apparatus including a plurality of cameras with different optical axis orientations, acquiring data of images of a chart captured from different directions by at least two cameras among the plurality of cameras, the chart including a plurality of planes forming a predetermined angle;

detecting, from each of the images, images of feature points of a pattern depicted on the chart and generating feature point information in which position coordinates of the images of the feature points are associated with position coordinates of the feature points on the chart; and acquiring a parameter including position and posture information between the cameras on a basis of the feature point information; wherein any one plane among the plurality of planes includes an area whose depicted pattern has been subjected to a projective transformation such that positions of the feature points uniformly appear in a field-of-view in at least one of vertical and horizontal directions despite being at different distances in real space, and an area whose depicted pattern is not subjected to the projective transformation.

11. A non-transitory, computer readable storage medium containing a computer program, which when executed by a computer which calibrates an imaging apparatus including a plurality of cameras with different optical axis orientations, causes the computer to perform a calibration method by carrying out actions, comprising:

acquiring data of images of a chart captured from different directions by at least two cameras among the plurality of cameras, the chart including a plurality of planes forming a predetermined angle;

detecting, from each of the images, images of feature points of a pattern depicted on the chart and generating feature point information in which position coordinates of the images of the feature points are associated with position coordinates of the feature points on the chart; and acquiring a parameter including position and posture information between the cameras on a basis of the feature point information; wherein any one plane among the plurality of planes includes an area whose depicted pattern has been subjected to a projective transformation such that positions of the feature points uniformly appear in a field-of-view in at least one of vertical and horizontal directions despite being at different distances in real space, and an area whose depicted pattern is not subjected to the projective transformation.

\* \* \* \* \*